United States Patent
Shrikhande et al.

(10) Patent No.: US 12,494,943 B1
(45) Date of Patent: *Dec. 9, 2025

(54) HANDLING INTERFACE CLOCK RATE MISMATCHES BETWEEN NETWORK DEVICES

(71) Applicant: Innovium, Inc., Santa Clara, CA (US)

(72) Inventors: Kapil Vishwas Shrikhande, Santa Clara, CA (US); William Brad Matthews, Los Gatos, CA (US); Meg Pei Lin, Saratoga, CA (US)

(73) Assignee: Innovium, Inc., Santa Clara, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 18/206,594

(22) Filed: Jun. 6, 2023

Related U.S. Application Data

(63) Continuation of application No. 17/224,081, filed on Apr. 6, 2021, now Pat. No. 11,671,281.

(51) Int. Cl.
*H04L 12/46* (2006.01)
*H04L 43/0852* (2022.01)
*H04L 47/36* (2022.01)
*H04L 69/324* (2022.01)

(52) U.S. Cl.
CPC ...... *H04L 12/4633* (2013.01); *H04L 43/0852* (2013.01); *H04L 47/365* (2013.01); *H04L 69/324* (2013.01)

(58) Field of Classification Search
CPC ....... H04L 47/10; H04L 47/22; H04L 47/225; H04L 47/36; H04L 47/365; H04L 69/22; H04L 69/324; H04L 12/4633; H04L 43/08; H04L 43/0852

See application file for complete search history.

(56) References Cited

U.S. PATENT DOCUMENTS

| | | |
|---|---|---|
| 2009/0097401 A1 | 4/2009 | Diab |
| 2012/0236878 A1 | 9/2012 | Shafai et al. |
| 2016/0380647 A1 | 12/2016 | Bansal et al. |

OTHER PUBLICATIONS

United States Patent and Trademark Office, U.S. Appl. No. 17/224,081, Non-Final Office Action dated Aug. 16, 2022.
United States Patent and Trademark Office, U.S. Appl. No. 17/224,081, Notice of Allowance dated Jan. 17, 2023.

*Primary Examiner* — Peter Chen
(74) *Attorney, Agent, or Firm* — Shield Intellectual Property PC; Kirk D. Wong

(57) ABSTRACT

The performance of a switch or other network device is improved by adjusting the number of idle bytes transmitted between data units—that is, the size of the interpacket gap—to increase the bandwidth of a network interface. In some embodiments, the adjustments may be made in a manner designed to compensate for potential mismatches between the clock rate of the network interface and clock rates of interfaces of other network devices when retransmitting data received from those other network devices. In yet other embodiments, the adjustments may be designed to increase available bandwidth for other purposes. In an embodiment, the idle reduction logic is in a Media Access Control ("MAC") layer of a network interface. The idle reduction logic may be enabled or disabled based on user preference, or programmatically based on factors such as a transmission utilization level for the MAC layer, buffer fill level, and so forth.

20 Claims, 10 Drawing Sheets

HANDLING INTERFACE CLOCK RATE MISMATCHES BETWEEN NETWORK DEVICES

PRIORITY CLAIM

This application claims benefit under 35 U.S.C. § 120 as a Continuation of U.S. application Ser. No. 17/224,081, filed Apr. 6, 2021, now issued as a U.S. Pat. No. 11,671,281, the entire contents of which is hereby incorporated by reference as if fully set forth herein.

TECHNICAL FIELD

Embodiments relate generally to computer networking, and, more specifically, to techniques for increasing the efficiency of communications between network devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. Each node may include one or more interfaces via which it may transmit data to and/or receive data from another node in the network via a transmission medium such as, without limitation, electrical cabling, optical cabling, or wireless media. Such data may be transmitted in the form of electrical, optical, radio, or other signals propagated over the transmission medium. The transmission medium connecting a set of nodes is also known as a communication link.

The frequency with which an interface is allowed to send signals over a communication link is governed by the capabilities of the transmission medium itself, the capabilities of the receiving interface, the protocol(s) used to encode the data to be transmitted in the signal, and/or other factors. For instance, depending on the architecture utilized, an interface might comprise one or more transmitters capable of transmitting signals at frequencies up to 2000 MHz or higher, over different paths and/or wavelengths.

Whenever there is data to send, a transmitter in the interface sends signals representing that data over the communication link at the selected frequency. For instance, a given unit of data might be encoded as a series of signals. At periodic time intervals, corresponding to the selected frequency, a next signal in the series is transmitted, until the entire series has been transmitted. The transmitter makes use of a clocking mechanism to determine when each interval lapses. The clocking mechanism emits an internal signal at a predefined frequency, with the resulting period between signals being known as a clock cycle. The clock cycles, in turn, indicate to the transmitter when it should send the next signal over the communication link (e.g. once per cycle, once every other cycle, etc.). One common clocking mechanism relies upon an electronic oscillator circuit such as a crystal oscillator, though any other suitable clocking mechanism may be utilized.

However, the clocking mechanism is typically not exact, such that there may be minor variances between each interval. As a result, for instance, a clocking mechanism intended to count 1000 clock cycles in a second might actually count 999 one second, 1001 another second, and so forth. A clocking mechanism is typically rated by both the nominal frequency of the mechanism (e.g. the number of times a crystal within the clocking mechanism is designed to vibrate in a second), as well as the maximum variance expected in that frequency. This variance is typically expressed in terms of "parts per million," or ppm, which indicates the maximum expected variance in the number of clock cycles that the clocking mechanism actually counts over a period of time in which it should count a million clock cycles. Hence, a clocking mechanism rated for 1 MHz with an error rate of +/−500 ppm would be expected to count anywhere between 999,500 and 1,000,500 clock cycles each second.

A network interface may be classified by the variance of its associated clocking mechanism, also known as the maximum transmit clock-rate variance. For instance, various Ethernet standards require network interfaces to have a maximum transmit clock-rate variance of no more than +/−100 ppm.

Under certain conditions within a network, a first network device may transmit data from a first network interface to a second network interface of a second network device, which then retransmits that data out a third network interface. For instance, the second network interface may be port-mapped to the third network interface, or the data may otherwise be routed directly out the third network interface. If the network interfaces are each rated at +/−100 ppm, the clocking mechanism associated with the first network interface may, in some cases, run up to 200 ppm faster than the clocking mechanism associated with the third network interface (e.g. a +100 ppm variance for the first interface compared to −100 ppm variance for the third interface). If this mismatch persists, depending on the amount of data being sent and the buffer space available at the second network device, the second network device may be forced to "drop" some of the data instead of sending the data, since the second network device is unable to send the data as fast as it is receiving the data.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
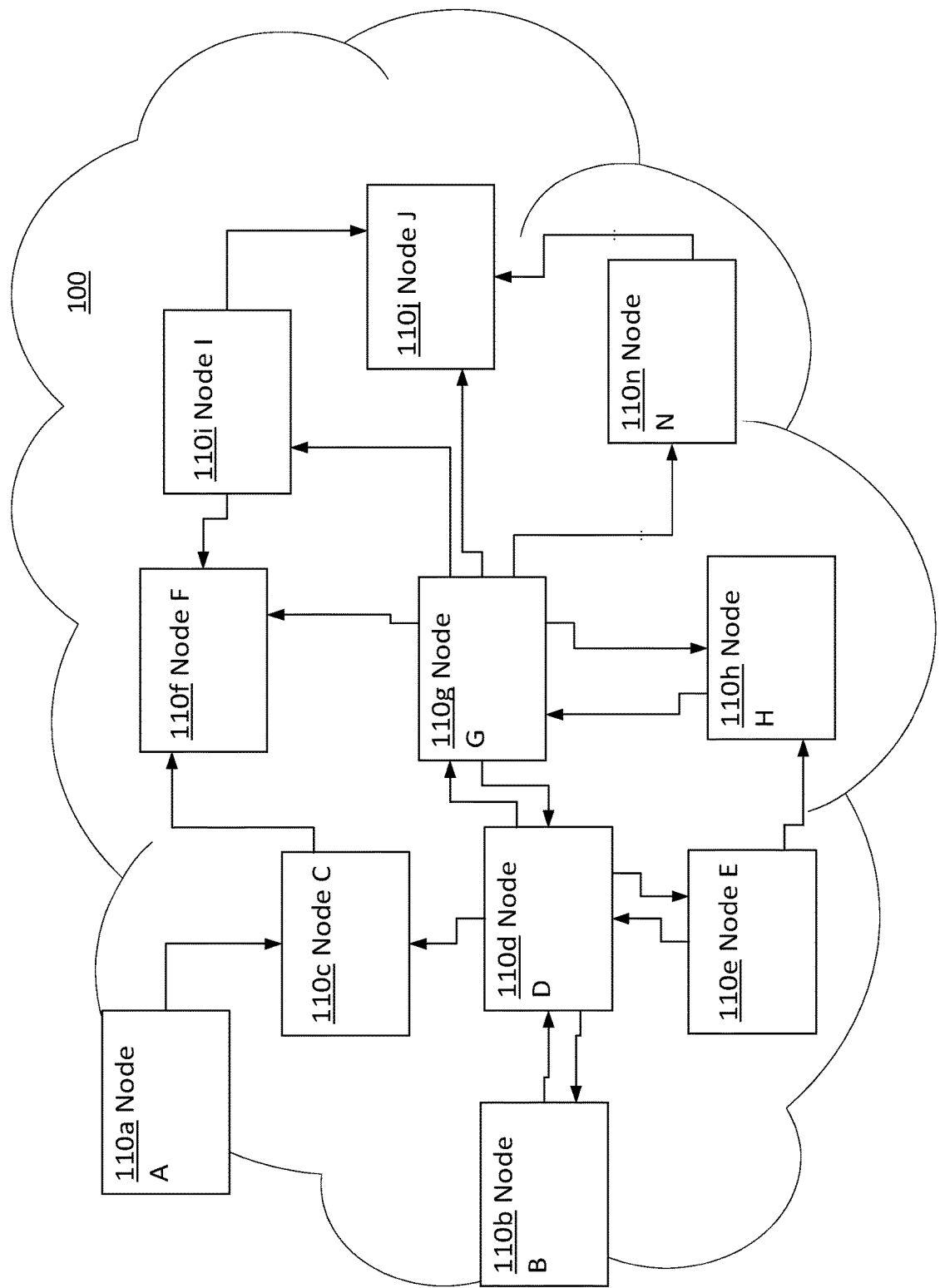
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0 General Overview
2.0. System Overview
  2.1. Network
  2.2. Data Retransmission
  2.3. Network Interface
  2.4. Idle Insertion Logic
  2.5. Idle Reduction Logic
  2.6. Miscellaneous
3.0 Functional Overview
  3.1. General Rate Compensation Flow
  3.2. Window-Based Idle Reduction
  3.3. Metric-Based Triggering of Idle Byte Removal
4.0. Example Idle Byte Removal Scenarios
5.0. Example Embodiments
6.0 Example Network Device
  6.1. Ports
  6.2. Packet Processors
  6.3. Buffers
  6.4. Queues
  6.5. Traffic Management
  6.6. Forwarding Logic
  6.7. Miscellaneous
7.0. Implementation Mechanism—Hardware Overview
8.0. Extensions and Alternatives

1.0. General Overview

Approaches, techniques, and mechanisms are disclosed for improving performance of switches or other network devices by adjusting the number of idle bytes transmitted in between data units—that is, the size of the interpacket gap—to increase the bandwidth of a network interface. According to some embodiments, the adjustments may be made in a manner designed to compensate for potential mismatches between the clock rate of the network interface and the clock rates of interfaces of other network devices when retransmitting data received from those other network devices. Such mismatches may be the result, for instance, of standard interface clock-rate variances, as described above. In yet other embodiments, the adjustments may be designed to increase available bandwidth for other purposes.

According to some embodiments, a network device includes a plurality of network interfaces interconnected by packet-handling logic, whereby data received via a first of the interfaces may be forwarded to others of the interfaces. Some or all of the network interfaces include idle insertion logic that inserts idle bytes between data units prior to the data units being transmitted out the interfaces to other network devices. The idle insertion logic includes or is coupled to idle reduction logic that causes fewer idle bytes to be inserted than would otherwise be inserted, thereby increasing transmission bandwidth for the interface.

In an embodiment, the idle insertion logic and idle reduction logic are in a Media Access Control ("MAC") layer of a network interface. The MAC layer comprises various logic configured to perform various functions associated with data link layer processing, in accordance with the Open Source Interconnection ("OSI") model of computer networking, or the link layer of the TCP/IP protocol stack. The MAC layer transmits data units, having the selected amount of idle bytes inserted therebetween, as a stream of data from the MAC layer to a physical layer. The physical layer, in turn, may perform further processing on the stream and eventually transmit the stream as signals over a transmission medium to another network device.

In an embodiment, the idle reduction logic simply removes a specified number of idle bytes from every interpacket gap. In other embodiments, the idle reduction logic may be configured to remove a specified number of idle bytes periodically or at other intervals. For instance, the idle reduction logic may be configured to remove four idle bytes every five microseconds. Hence, the idle reduction logic may let many interpacket gaps pass without modification, but would select one interpacket gap every five microseconds to reduce in size by four bytes.

In an embodiment, a user may program a target interpacket gap size for the interface. The size may be the same between all data units, or the idle insertion logic may be configured to select the amounts of idle bytes between given data units in such a manner as to maintain the target interpacket gap size on average. For instance, a target interpacket gap size of twelve bytes may, in an embodiment, be obtained by alternating between interpacket gaps of eight bytes and sixteen bytes. In either event, the idle reduction logic may execute after the idle insertion logic has already selected the amount of idle bytes to insert between a set of data units, thereby resulting in actual average interpacket gap size that is smaller than the target interpacket gap size.

In an embodiment, the idle reduction logic only reduces the number of idle bytes when the idle insertion logic inserts more than a threshold number of idle bytes—for instance, rather than reduce the size of an eight-byte interpacket gap, the idle reduction logic may wait to reduce the size of a sixteen-byte interpacket gap.

In an embodiment, the idle reduction logic may calculate the number of idle bytes to remove and/or a frequency with which to remove the number of idle bytes based on a specification of additional bandwidth that is required or desired. In an embodiment, the bandwidth may be specified in terms of bytes or PPM. In an embodiment, the additional bandwidth may be determined based on the clock rate variance observed at the network interface.

In an embodiment, the idle reduction logic may be enabled or disabled based on user preference, or programmatically based on factors such as a transmission utilization level for the MAC layer, a buffer fill level, and so forth. In an embodiment, a MAC layer may include an idle control input which may signal to the idle reduction logic to remove a predefined number of idle bytes. The idle reduction logic may, in response to receiving a signal over the input, remove the predefined number of idle bytes from the next eligible interpacket gap. The signal may be sent by hardware or software, which may be internal or external to the MAC layer, based on factors such as those explained above.

2.0. System Over View

2.1. Network

FIG. 1 is an illustrative view of various aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in one or more application-specific integrated circuits (ASICs), field programmable gate arrays (FPGAs), and/or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. The hardware and/or other logic by which a node sends and receives data over a communication link is referred to as a network interface, or simply an interface. Note that system 100 illustrates only one of many possible arrangements of nodes within a network. Other networks may include fewer or additional nodes 110 having any number of links between them.

While each node 110 may or may not have a variety of other functions, in an embodiment, each node 110 is configured to send, receive, and/or relay data to one or more other nodes 110 via these links. In general, data is communicated as series of discrete units or structures represented by signals transmitted over the communication links.

The structure and transmission of data between nodes 110 is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), which is a discrete unit of data that the layer acts upon. For instance, the PDU of the next layer, known as the data link layer, will typically be an Ethernet frame. The PDU of the following layer, known as the network layer, is typically an Internet Protocol packet, which is encapsulated inside the Ethernet frame. Yet another layer is a transport layer, in which packets defined by the network layer are combined to form a PDU known as a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

For convenience, many of the techniques described in this disclosure are described with respect to embodiments where the data units (PDUs) are IP packets in a L3 (level 3, or network layer) network or Ethernet frames in an L2 (level 2, or data link layer) network, in which contexts the described techniques have particular advantages. It will be recognized, however, that these techniques may also be applied to realize advantages in handling other types of data units conforming to other protocols and/or at other communication layers within a network. Thus, unless otherwise stated or apparent, the techniques described herein should also be understood to apply to contexts in which the PDUs are of any other types of data structures communicated across a network, such as segments, InfiniBand Messages, datagrams, etc. That is, in these contexts, other types of data structures may be used in place of packets, frames, and so forth.

A given node 110 may not necessarily have a link to each other node 110, particularly in more complex networks. For example, in wired networks, each node may only have a limited number of interfaces, and hence a limited number of physical ports into which cables may be plugged in to create links. Certain "terminal" nodes 110—often servers or end-user devices—may only have one or a handful of ports. Other nodes 110, such as switches, hubs, or routers, may have a great deal more ports, and typically are used to relay information between the terminal nodes. The arrangement of nodes 110 and links in a network is said to be the topology of the network, and is typically visualized as a network graph or tree.

A given node 110 in the network 100 may communicate with another node 110 in the network 100 by sending data units along one or more different paths through the network 100 that lead to the other node 110, each path including any number of intermediate nodes 110. The transmission of data across a computing network 100 typically involves sending units of data, such as packets, cells, or frames, along paths through intermediary networking devices, such as switches or routers, that direct or redirect each data unit towards a corresponding destination.

In an embodiment, a node 110 does not actually need to specify a full path for a data unit that it sends. Rather, the node 110 may simply be configured to calculate the best path for the data unit out of the device (e.g. which egress port it should send the data unit out on). When a node 110 receives a data unit that is not addressed directly to the node 110, based on header information associated with a data unit, such as path and/or destination information, the node 110 relays the data unit along to either the destination node 110, or a "next hop" node 110 that the node 110 calculates is in a better position to relay the data unit to the destination node 110. In this manner, the actual path of a data unit is the product of each node 110 along the path making routing decisions about how best to move the data unit along to the destination node 110 identified by the data unit.

While a data unit is passing through an intermediary node 110—a period of time that is conceptualized as a "visit" or "hop"—the node 110 may perform any of a variety of actions, or processing steps, with the data unit. The exact set of actions taken will depend on a variety of characteristics of the data unit, such as metadata found in the header of the data unit, and in many cases the context or state of the node 110. For example, address information specified by or otherwise associated with the data unit, such as a source address, a destination address, or path information, is typically used to determine how to handle a data unit (e.g. what actions to take with respect to the data unit). For instance, an Internet Protocol ("IP") data packet may include a destination IP address field within the header of the IP data packet, based upon which a network device may determine one or more other networking devices, among a number of possible other networking devices, to forward the IP data packet to. The logic within a node 110 that controls the specific set of actions performed with respect to a given data unit is often referred to as "packet-switching" or "packet-handling" logic.

2.2. Data Retransmission

Figure 2:
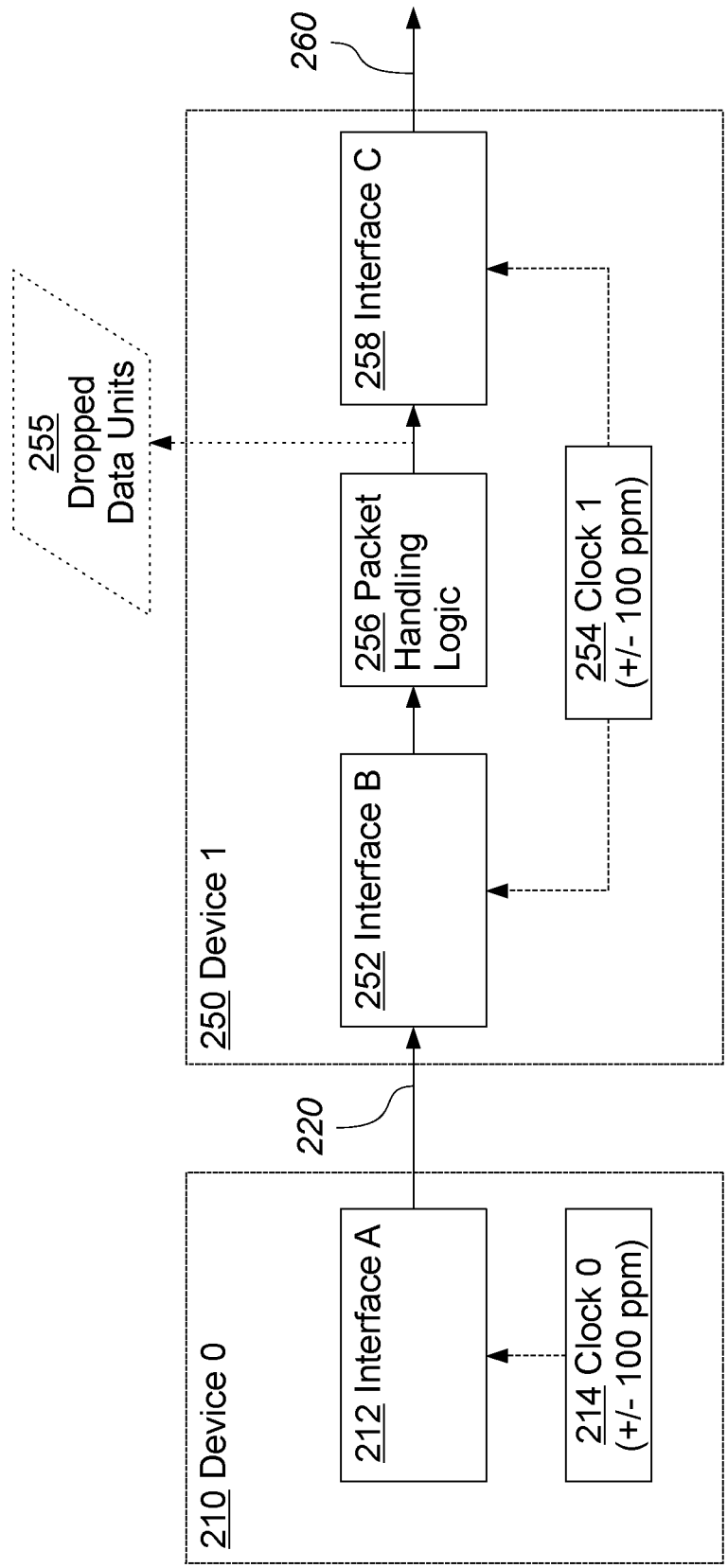
FIG. 2 illustrates an arrangement of interconnected devices in which a first device is configured to send data to a second device, which retransmits that data over a different interface.

Certain nodes within a network, such as switches or routers, may forward data that they receive over one interface out another interface. FIG. 2 illustrates an arrangement of interconnected devices in which a first device 210 is configured to send data to a second device 250, which retransmits that data over a different interface, according to an embodiment. Devices 210 and 250 are nodes within a network such as, for instance, nodes 110 of network 100. Devices 210 and 250 may be any type of device, though in some embodiments device 250 is a network switch or router. In an embodiment, device 210 may be another switch, a terminal node, or any other suitable device.

Devices 210 and 250 include various network interfaces, including without limitation interface 212 of device 210 and interfaces 252 and 258 of device 250. Each of these interfaces may be any suitable type of network interface, such as a 100 Gigabit Ethernet interface, 800 Gigabit Ethernet interface, Fibre Channel interface, InfiniBand interface, and so forth. Each interface may be implemented by logic within one or more application-specific integrated circuits (ASICs), field programmable gate arrays (FPGAs), or other integrated circuit(s). In an embodiment, the interfaces may be implemented within a system-on-a-chip along with other interfaces and/or logic (not depicted). In yet other embodiments, at least some components of an interface may be implemented by a processor executing software-based instructions.

Interfaces 212 and 252 are physically coupled by a communication link 220. Interface 258 is similarly connected to a communication link 260, which is connected on the other end to an interface of yet another device (not depicted). Each communication link may be any suitable transmission medium, such as twisted pair copper wiring, optical fiber, and so forth.

Network interface 212 is configured to receive data intended for transmission over communication link 220 from any of a variety of other components within or coupled to device 210. For instance, device 210 may include one or more CPUs configured to execute server or client applications that generate data units (e.g. IP packets) that need to be communicated to other devices on a network. These data units are sent to interface 212 for transmission across the network. Or, device 210 may include packet-switching logic or other logic that generates and/or processes data units intended for transmission across the network.

Interface 212 may include a variety of components, typically organized into layers, that perform various processing on the data units prior to transmitting the data units out communication link 220. Such processing may include, for instance, data link layer processing such as frame encapsulation, inserting frame delimiters, inserting frame preambles, inserting idle bytes between frames, and so forth. Such processing may also include physical layer processing such as scrambling, encoding, alignment marker insertion, and so forth. The frame-encapsulated data units are then serialized and converted into a stream of signals that is sent across the communication link 220 to interface 252.

Each signal is sent separately over the communication link 220, at a rate of one signal per each cycle of a reference clock 214. In some embodiments, link 220 may include multiple lanes or channels, in which case a different signal may be sent over each lane or channel each clock cycle. The reference clock 214 may be in, or coupled to, interface 212. Signals from clock 214 may or may not be used for other purposes within device 210. Clock 214 may be any suitable clocking mechanism, and may include, for instance, a crystal oscillator. In an embodiment, the clock rate variance of clock 214 is +/−100 ppm, though clocking mechanisms with higher or lower variances may be used instead.

Interface 252 receives the signals via communication link 220 at the same rate as the signals are sent (e.g. using reference clock information in the stream). The signals are deserialized and then processed by various components of interface 252, again organized into layers, to reverse the processing done by interface 212, thereby reconstructing the frames and eventually the data units that were sent by the interface 212. This processing may include, for instance, physical layer processing such as descrambling, decoding, and alignment. This processing may also include data link layer processing such as frame detection and synchronization, error detection, malformed frame removal, interpacket gap removal, preamble removal, payload extraction, and so forth.

Interface 252 then forwards data units to packet handling logic 256. For the purposes of this disclosure, packet handling logic 256 may be any logic that causes some or all data units that interface 252 receives from interface 212 to be sent out another interface 258. Depending on the device type of device 250, packet handling logic 256 may comprise a variety of components for analyzing, forwarding, responding to, or taking other actions indicated by the data units. For instance, in an embodiment where device 250 is a network switching device, packet handling logic 256 may include components such as packet processors, traffic managers, forwarding logic, memory buffers, queueing logic, and so forth. Based on comparing address information in headers of the data units to information in a forwarding table, the packet handling logic may resolve the data units to a path that corresponds to interface 258, and hence forward the data units to interface 258. Of course, packet handling logic 256 may take any other suitable form. Moreover, packet handling logic 256 may, in some embodiments, be coupled to any number of additional interfaces similar to interfaces 252/258, and be configured to forward a data unit received via any of these interfaces to any other interface to which the packet handling logic 256 may resolve the data unit.

Interface 258 is configured to process the data units it receives prior to transmitting those data units, in the same manner as interface 212. Moreover, interface 258 is configured to serialize and convert the data units into a stream of signals that is sent across the communication link 220, in the same manner as interface 212 with respect to communication link 220. However, interface 258 is clocked to reference clock 254, such that one signal is sent per each clock cycle of clock 254 (per lane or channel, if applicable). Clock 254 may be any suitable clocking mechanism within or coupled to interface 258. In an embodiment, clock 254 is a similar clocking mechanism to clock 214.

Note that, while the functionalities of the specific interfaces 212, 252, and 258 are described above in the context of traffic flowing one way through the devices 210 and 250, each of the interfaces will likely include components for both sending and receiving data units, such that traffic may also flow from device 250 to device 210. For instance, interface 252 will typically also have the same components that interface 252 has for processing data units prior to sending the data units, while interface 212 will typically also have the same components that interface 212 has for reversing such processing when receiving data.

In some embodiments, interface 212 and interface 258 may both be configured to transmit data at a same nominal maximum rate, and thus have the same nominal bandwidth. Under certain configurations and/or traffic patterns, interface 212 may be transmitting data at the maximum rate for an extended period of time, while packet handling logic 256 is configured to forward all of that data to interface 258 and out communication link 260. For instance, packet handling logic 256 may be configured to port-map interface 252 to interface 258. Or, all data sent by interface 212 may be directed to an address that packet handling logic 256 can only reach via interface 258.

In any event, in some cases, even if interfaces 212 and 258 have a same nominal maximum transmission rate, interface 258 may not be able to keep up with interface 212 on account of clock rate variance between clock 214 and clock 254. For instance, clock 214 may have an average variance of +75 ppm, while clock 254 has an average variance of −80 ppm. Hence, for every million bits transmitted by interface 212, interface 258 would be approximately 155 bits behind. While the packet handling logic 256 may temporarily avoid data loss by buffering the data that interface 258 cannot send, eventually the buffers may be unable to store all of the unsent data, resulting in dropped data units 255.

2.3. Network Interface

Figure 3:
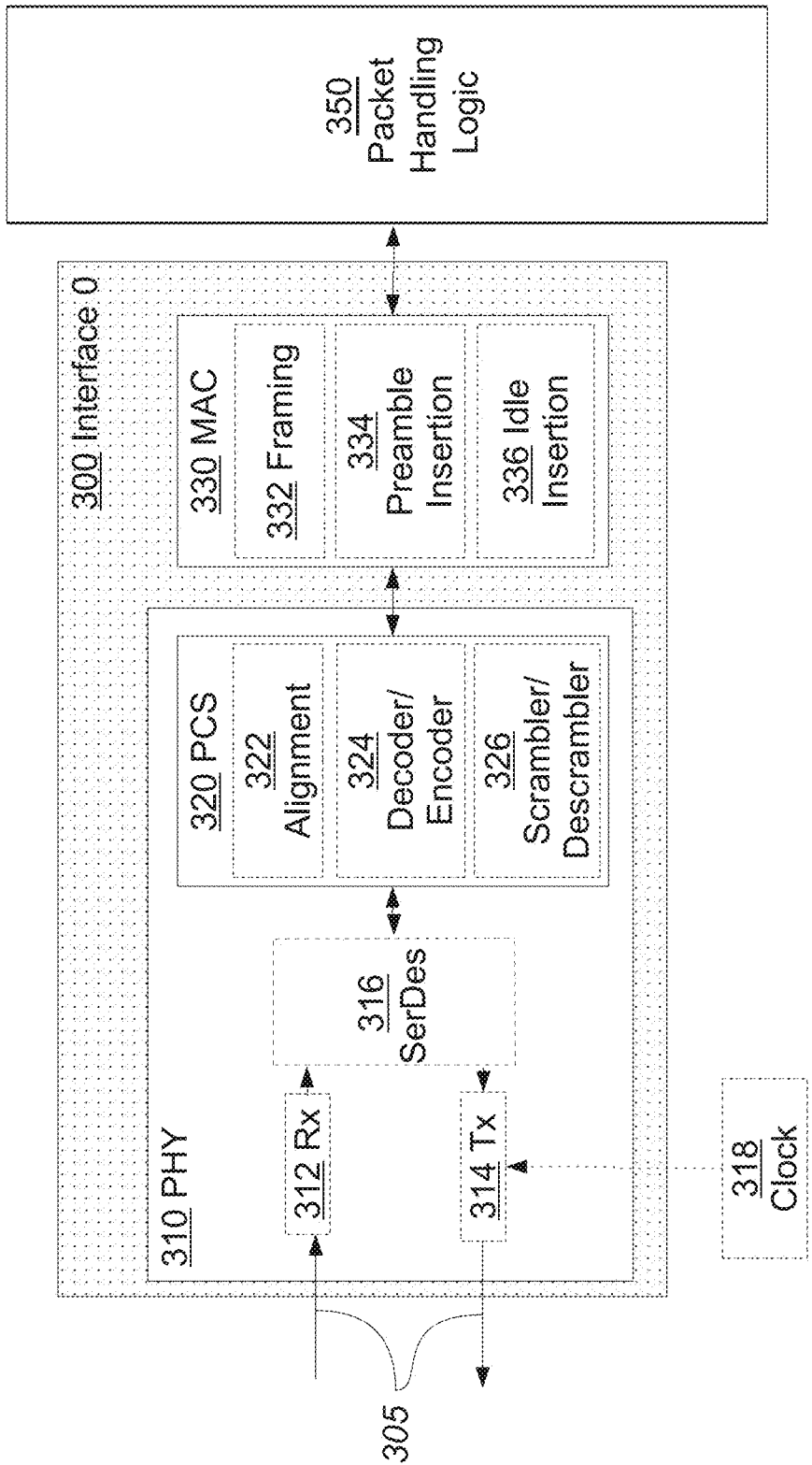
FIG. 3 illustrates example components of a network interface.

FIG. 3 illustrates example components of a network interface 300, according to an embodiment. Interface 300 may be used by any of a variety of network devices for communication over a network. For instance, in an embodiment, interface 300 is an example of an interface 252 or 258 in FIG. 2. However, in other embodiments, interface 300 may be utilized in network devices other than those depicted in FIG. 2. Conversely, the network devices 210 and 250 of FIG. 2 may utilize interfaces having different arrangements of components than those depicted in FIG. 3.

Interface 300 is coupled to a communication link 305, comprising wiring or other transmission media capable of carrying signals to and from interface 300. For instance, communication link 305 may be similar to communication link 220 or 260 from FIG. 2. Interface 300 includes a Physical Layer ("PHY") Layer 310 by which the interface 300 is coupled to the communication link 305. The Physical Layer 310 comprises hardware for transmitting signals to and receiving signals to from communication link 305, in the form of transmitter 314 and receiver 312. These and other related components (not depicted) are sometimes considered to form a Physical Media Dependent ("PMD") sublayer of the Physical Layer 310.

The transmitter 314 is responsible for transmitting signals representative of data units. These signals are sent at a rate of up to one signal per available channel in the communication link 305 each clock cycle of a clock 318. The clock 318 may be any suitable clocking mechanism, including without limitation clock 254 of FIG. 2. The receiver 312, conversely, receives signals over the communication link 305 at a rate of up to one signal per available channel in the communication link 305 each clock cycle of a clock at another network device at the other end of the communication link 305 (not depicted). Depending on the embodiment, the signals may encode the data they represent in various forms, such as using a Manchester encoding, Non-Return-to-Zero ("NRZ") encoding, Pulse-amplitude Modulation (e.g. PAM4), and so forth.

The Physical Layer 310 further includes a Serializer/Deserializer ("SerDes") 316. The SerDes 316 takes a stream of data received by the receiver 312 and converts it into multiple parallel streams of data for processing at the next layer 320. Conversely, the SerDes 316 collapses multiple parallel streams of data in to a single stream for transmission by the transmitter 314. The SerDes 316 may, in some embodiments, be considered part of a Physical Medium Attachment ("PMA") sublayer, which may include logic for yet additional processing of data on its way in and out of the interface 300.

Data received by the SerDes 316 is sent to a Physical Coding Sublayer (also referred to herein as a "PCS layer") 320 for further processing. Conversely, the SerDes 316 receives data in the form of streams from the PCS sublayer 320. The PCS sublayer 320 may include a variety of components for processing data. These components may include, without limitation, alignment logic 322, encoder/decoder 324, and/or scrambler/descrambler 326.

The alignment logic 322 is configured to insert alignment markers into data streams before they are transmitted to the network, and to use alignment markers to re-align data as it is received from the network. In some embodiments, the alignment logic 322 may remove idle bytes from data streams to make room for inserting alignment markers. Decoder/encoder 324 is configured to decode data streams received from the network, and to encode data streams prior to transmission to the network. For instance, data may be encoded using a 64b/66b line code prior to transmission to the network, and decoded from the 64b/66b line code upon receipt from the network. Of course, other coding schemes may also or instead be used. Scrambler/descrambler 326 is configured to scramble a data stream prior to transmission to the network, and descramble a data stream upon receipt from the network. The data stream may be scrambled according to any suitable algorithm.

The PCS layer 320 is coupled to a MAC layer 330, to which the PCS layer 320 sends inbound data that has been processed by the Physical Layer 310, and from which it receives outbound data that is to be transmitted by the Physical Layer 310. MAC layer 330 is in turn coupled to packet handling logic 350, which may be similar to packet-handling logic 256. MAC layer 330 is, in general, responsible for encapsulating data units received from the packet-handling logic 350 into a stream of frames for transmission by the Physical Layer 310, and converting a stream of frames received from the Physical Layer back into data units that can be sent to and processed by the packet handling logic 350.

More specifically, MAC layer 330 includes a framing component 332 that is responsible for encapsulating the data units received from the packet-handling logic 350 into frames, adding MAC addressing information and other metadata, adding suitable data for indicating where those frames begin and/or end, and so forth. The framing component 332 removes such metadata from each frame when receiving frames from the network, and extracts the payload of the frame as a data unit to be transmitted to the packet-handling logic 350.

MAC layer 330 further includes preamble insertion logic 334 configured to insert preambles in front of each frame. The preamble may be any suitable sequence of data that indicates that a new frame is starting in a data stream, such as a seven octet (byte) pattern of alternating 1 and 0 bits, followed by a start frame delimiter (e.g. 10101011). The preamble insertion logic 334 may include or be accompanied by counterpart logic for recognizing and removing preambles and delimiters from data streams arriving over the network.

MAC layer 330 further includes idle insertion logic 336 configured to insert interpacket gaps between each frame, thereby resulting in a stream of alternating preambles, frames, and interpacket gaps. Each interpacket gap consists of a number of idle bytes. An idle byte is a byte that, depending on the transmitter 314, either causes the transmitter 314 to transmit no signal at all (for the duration of time equal to the time it would have taken to transmit the byte), resulting in a period of time in which no signal is transmitted by the transmitter 314, or that signals to the transmitter 314 to transmit an idle signal, which is understood not to represent any data. Depending on the embodiment, an interpacket gap of a certain size may be needed to allow for receiver clock recovery, permit the receiver to prepare for another frame (e.g. when powering up from a low-power state), or other purposes.

The idle insertion logic 336 may include or be accompanied by counterpart logic for recognizing and removing idle bytes from the data stream. Operation of the idle insertion logic 336 is described in further detail in subsequent sections.

Interface 300 is but one example of an arrangement of components that form a network interface, according to an embodiment. In other embodiments, interface 300 may have fewer or additional components in varying arrangement. For example, MAC layer 330 may, in some embodiments, actually be a sublayer of a data link layer, which may further comprise a logical link control sublayer deployed between the MAC layer 330 and the packet handling logic 350. Moreover, while the PCS sublayer 320 is depicted as being a part of the Physical Layer 310 from a logical standpoint, in some embodiments, the PCS sublayer 320 is actually integrated into the same hardware as the MAC layer 330, and is thus physically separate from the rest of the Physical Layer 310. Furthermore, for ease of explanation, various other components of the interface 300 are not mentioned, but will be known to those skilled in the art.

2.4. Idle Insertion Logic

Figure 4:
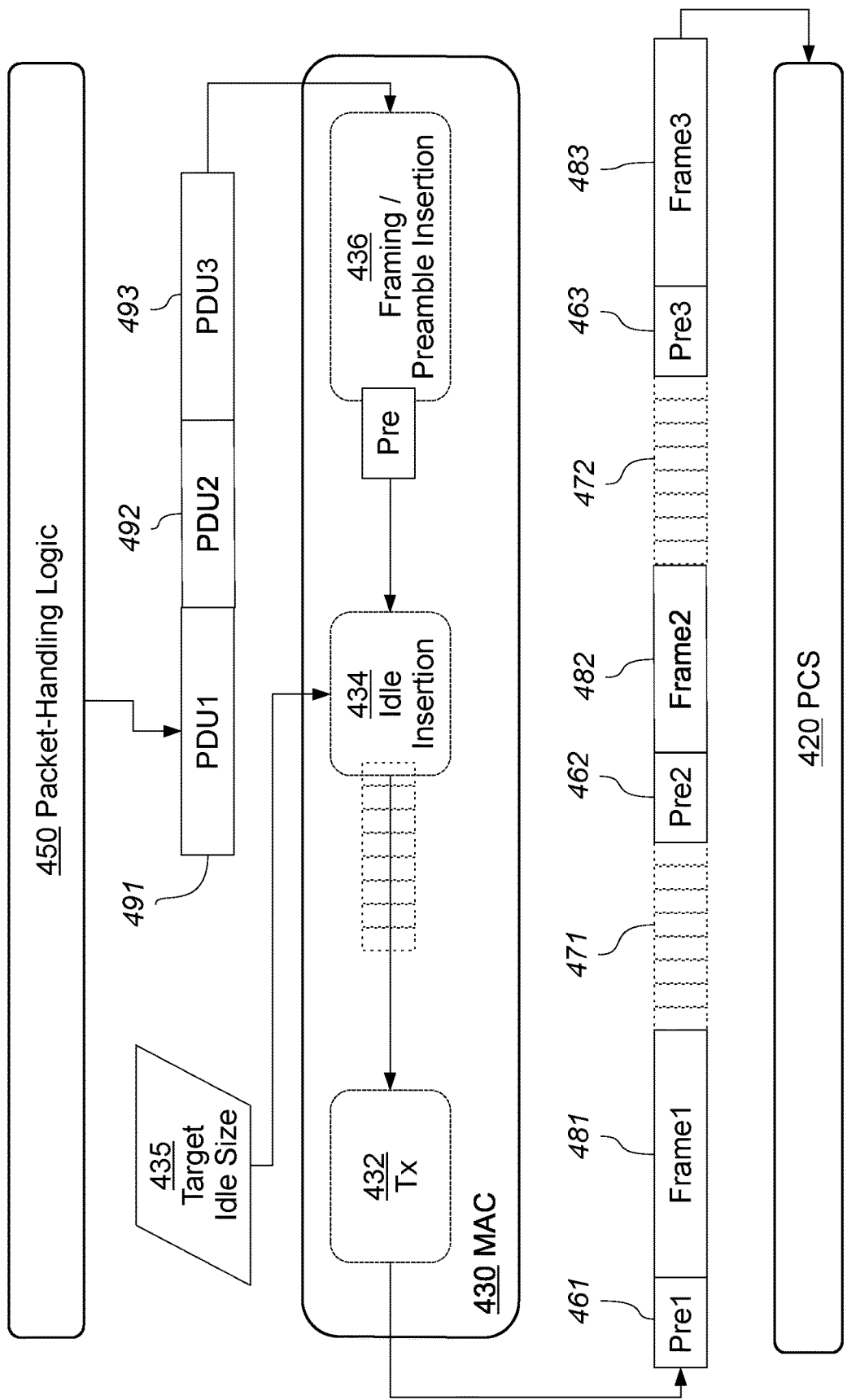
FIG. 4 illustrates the operation of idle insertion logic in a network device.

FIG. 4 illustrates the operation of idle insertion logic 434 in a network device 400, according to an embodiment. Network device 400 may be any network device, such as device 210 or 250 of FIG. 2, that comprises a network interface, such as interface 300. Of course, network device 400 may be implemented with or without the specific implementation details of FIG. 2 and FIG. 3. Similarly, the devices and interfaces of FIG. 2 and FIG. 3 need not be limited to the specific implementation details depicted in FIG. 4.

Device 400 includes packet-handling logic 450. As with packet-handling logic 256 or 350, packet-handling logic 450 may be any suitable logic that sends a series of data units to an interface for transmission. Packet-handling logic 450 may be, for example, packet-switching logic, application logic, and so forth. As depicted, packet-handling logic 450 is sending a series of data units 491-493 (labeled PDU1, PDU2, and PDU3) to a MAC layer 430. The data units 491-493 are not necessarily sent at the same time, but rather may be sent in succession over a number of clock cycles. The data units 491-493 may be sent directly to the MAC layer 430, or may first pass through one or more intermediary components, such as a logical link control sublayer (not depicted). The data units are considered to be outbound, in that they are intended for transmission out of device 400 to another device connected to the interface of which the MAC layer 430 is a component.

MAC layer 430, which may or may not be the same as MAC layer 330 in FIG. 3, has an outbound receiver (not depicted) that receives the outbound data units. The outbound receiver relays the data units to a next processing component in the MAC layer 430, which in the depicted embodiment is framing and preamble insertion logic 436. This logic 436 is generally responsible for encapsulating each data unit 491-493 in a separate frame (frames 481-483, respectively). Each frame 481-483 includes the corresponding data unit 491-493 as its payload. Each frame 481-483 further includes appropriate MAC addressing information and other relevant fields. The logic 436 inserts a preamble and frame delimiter 461-463 before each frame 481-483.

MAC layer 430 further includes idle insertion logic 434. Idle insertion logic 434 inserts idle bytes between each frame (e.g. before or after each frame generated by the framing logic 436). The inserted idle bytes form an interpacket gap. Idle insertion logic 434 may include logic for determining how many idle bytes to insert between a given pair of frames. For instance, the number of idle bytes may always be a number defined by programmable or interface-specific target gap size configuration data 435.

Or, the idle insertion logic 434 may select the number of idle bytes to insert in such a manner that the average number of idle bytes matches the target gap size 435 over a period of time. In this case, there may be constraints on the number of idle bytes that may be inserted—for instance, a downstream component such as the PCS 420 may expect the number of idle bytes to be a multiple of eight. If the target gap size is twelve, then it would be necessary to alternate between inserting eight bytes and sixteen bytes to maintain the average target gap size 435 of eight.

In some embodiments, the idle insertion logic 434 may utilize a counter known as a deficit idle count to track the difference between the number of idle bytes it should have inserted thus far to maintain the target gap size 435 and the number of idle bytes that were actually inserted (prior to any idle byte removal in accordance to the techniques described herein). The deficit idle count is incremented by the target average gap size before a new interpacket gap is to be inserted. There is a fixed block size, of which the interpacket gap must be a multiple in order to maintain compatibility with downstream logic. The selected size of the interpacket gap will typically be the highest multiple of that block size that is still less than the current deficit idle count. The deficit idle count is then reduced by the selected interpacket gap size (again, without taking into account any removal of idle bytes for rate compensation purposes).

MAC layer 430 further includes an outbound transmitter 432 that transmits the processed frames and idle bytes as a stream of data to the PCS layer 420. For instance, as a result of the MAC layer processing data units 491-493, a stream of data is transmitted to PCS layer 420 comprising, in succession, preamble 461, frame 481, interpacket gap 471, preamble 462, frame 482, interpacket gap 472, preamble 463, and frame 483. PCS layer 420 then performs processing on the stream typical of the PCS sublayer, such as, without limitation, described with respect to PCS 320. The stream may be further processed by other interface logic (e.g. Physical Layer 310) and then transmitted out to the network.

FIG. 4 illustrates but one example of the operation of idle insertion logic in a network device. Other embodiments may include additional or fewer components in varying arrangements. For example, although idle insertion logic 434 is depicted as being deployed after the framing and preamble insertion logic 436, in some embodiments, the ordering may be reversed. Moreover, the MAC layer 430 may include additional processing components that are not depicted. These processing components may insert additional elements into the data stream transmitted to the PCS 420. Furthermore, the division of work between layers and components may vary, depending on the embodiment.

2.5. Idle Reduction Logic

Figure 5:
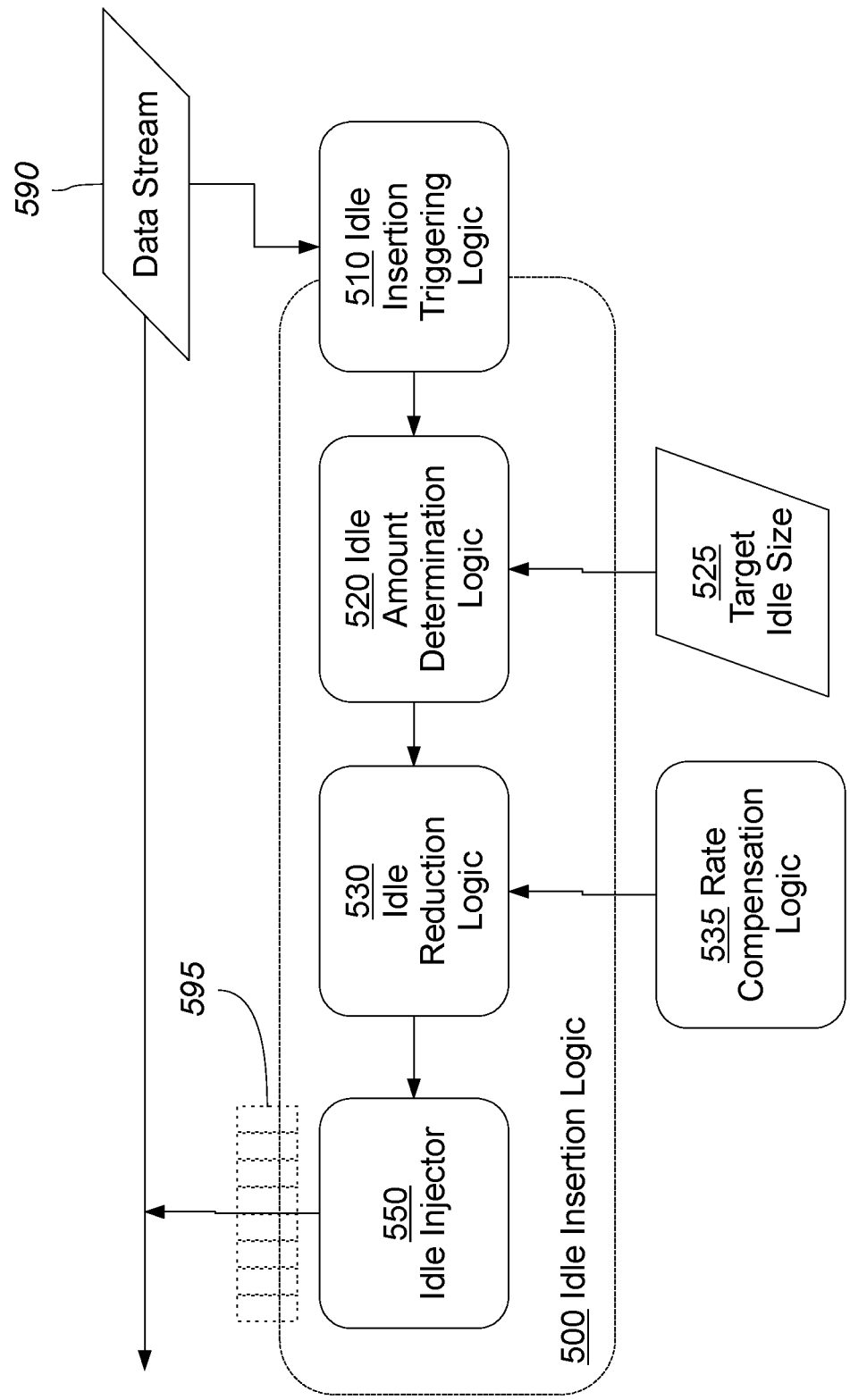
FIG. 5 illustrates example idle insertion logic with idle reduction logic.

FIG. 5 illustrates example idle insertion logic 500 with idle reduction logic 530, according to an embodiment. In an embodiment, idle insertion logic 500 is an example of idle insertion logic 434. However, idle insertion logic 500 may also be utilized in contexts other than FIG. 4, while idle insertion logic 434 need not necessarily include the implementation details of FIG. 5. Idle insertion logic 500 is generally configured to insert idle bytes into a data stream 590.

Specifically, idle insertion logic 500 is configured to insert idle bytes between each pair of data units, or frames, in data stream 590. The data stream 590 is received in a sequence over time. Idle insertion logic 500 may include or be coupled to idle insertion triggering logic 510 which indicates when to insert idle bytes into the data stream 590. For example, the idle insertion triggering logic 510 may monitor the data stream 590, detect when an insertion point for the idle bytes has been reached, and cause the idle insertion logic 500 to insert idle bytes. The idle insertion triggering logic 510 may, for instance, monitor for the beginning or end of a new frame or data unit, and determine to insert the idle bytes before or after the frame or data unit. In an embodiment, the idle insertion triggering logic 510 may instead be integrated into framing logic or preamble insertion logic, such that idle insertion logic 500 is automatically executed responsive to encapsulating a data unit in a frame and/or inserting a preamble.

Idle insertion logic 500 further includes idle amount determination logic 520. The idle amount determination logic 520 determines a number of idle bits or bytes—that is, the size of the interpacket gap—to insert into the data stream 590. The amount may be, for instance, a function of a target idle size 525, an amount chosen using a deficit idle count, etc., as described in the previous section.

Idle insertion logic 500 further includes idle reduction logic 530. Generally, the idle reduction logic 530 reduces the number of idle bits or bytes to be inserted so as to increase the transmission rate. Idle reduction logic 530 may, for instance, input the number decided upon by the idle amount determination logic 520, and output a potentially reduced number based on various considerations described subsequently. Idle reduction logic 530 effectively reduces the actual interpacket gap size below the size that would have been chosen had only the default or target interpacket gap size been considered.

Though, in an embodiment, idle reduction logic 530 may reduce the size of every interpacket gap by a fixed amount, in other embodiments, idle reduction logic 530 only reduces the number of idle bytes from certain interpacket gaps. For example, there may be a minimum or fixed number of bytes that can be removed from an interpacket gap (e.g. due to downstream component constraints, such as a size of a PCS block, or other constraints). The idle reduction logic 530 may be configured to keep track of time windows, and to remove this minimum or fixed number of bytes from an interpacket gap once per time window. Other interpacket gaps generated during the time window are not reduced in size. In an embodiment, the time window and/or number of idle bytes to remove may be selected so as to achieve an increase in transmission rate of a certain amount.

As another example, the idle reduction logic 530 may be configured to reduce interpacket gaps, or the size of the data stream, by a certain amount on average (e.g. a number of bits equivalent to 200 ppm), but again there may be a minimum or fixed amount of bytes that can be removed from an interpacket gap. Consequently, the idle reduction logic 530 may include a counter that is increased by a certain number bits per each interpacket gap, or per each bit in the data stream, until the minimum or fixed number of bytes is reached. The minimum or fixed number of bytes may then be removed from the next interpacket gap.

In an embodiment, the idle reduction logic 530 may be activated by rate compensation logic 535. The rate compensation logic 535 may be internal to the MAC layer or interface in which the idle insertion logic 530 is implemented, or may be external hardware or software. The idle reduction logic 530 may by default be in an inactive state, in which no idle bytes are removed. Rate compensation logic 535 may, for instance, send a signal to idle reduction logic 530 that indicates to the idle reduction logic 530 that it should remove idle bytes. Depending on the embodiment, idle reduction logic 530 may remove idle bytes immediately from the next interpacket gap, or idle reduction logic 530 may begin a counter to determine when to remove the idle bytes, as explained above. The number of idle bytes to remove may be determined by the idle reduction logic 530 (e.g. a fixed amount, a configurable amount, etc.), or the rate compensation logic 535 may specify the number of bytes to remove.

In an embodiment, the rate compensation logic 530 may be programmable, in that the number of bytes to remove and/or the frequency with which it signals to the idle reduction logic 530 to remove idle bytes may be set by a user. For instance, a user may set a time window and a number of idle bytes to remove within that time window. Or, a user may specify a ppm rate (e.g. an expected ppm mismatch between two interfaces), and the rate compensation logic 530 may be configured to calculate the number of bytes to remove and/or time window for removal using the specified ppm rate and the bandwidth of the interface.

For instance, if the user requests an idle reduction of 200 ppm, the interface would need to deliver an additional 200 bits per one million bits transferred. For a 100 Gb/s interface, it would take 10 microseconds to transfer one million bits. If the reduction amount is fixed at 8 bytes (64 bits), then the rate compensation logic 530 would need to send a signal to the idle reduction logic every 3.2 microseconds in order to increase the transmission rate by 200 bits in 10 microseconds.

In an embodiment, the rate compensation logic 535 activates the idle reduction logic 530 only under certain circumstances. For instance, idle reduction may be enabled or disabled completely by a user. Or, the rate compensation logic 535 may activate or deactivate the idle reduction logic 535 based on various metrics related to the operation of the interface and/or network device in which the idle reduction logic 530 is implemented. For instance, the rate compensation logic 535 may signal the idle reduction logic 530 only when a transmission utilization level for the interface, or buffer fill level associated with the interface, exceeds a certain threshold. The threshold may be fixed or programmable. In an embodiment, the threshold is a very high threshold, such as within 1%, 0.1%, etc. of the maximum utilization and/or fill level, since rate compensation for clock rate variance mismatches may only be needed when the interface is transmitting at or close to its maximum rate for an extended period of time. On the other hand, in other embodiments, the threshold may be much lower.

In an embodiment, rate compensation logic 535 only activates the idle reduction logic 530 when the actual transmission bitrate observed in the MAC layer is greater than a certain threshold. For instance, the idle reduction logic 530 may only be activated if the actual transmission bitrate is close to 100% of the maximum bandwidth. In some embodiments, the threshold may correspond to within 200 ppm (e.g. 99.9998%) of maximum bandwidth. In some embodiments, the idle reduction logic may be activated at a somewhat lower threshold (e.g. above 99.999%, 99.99%, 99.9% etc.). The rate compensation logic 535 may count the total number of bits being transmitted, including frames, preambles, and interpacket gaps, over a specific time window, and compare this to some threshold above which utilization is considered to be high for the time window. If the threshold is exceeded, the next interpacket gap may thus be reduced in size.

As a shorthand, instead of counting the bits exactly, the frame compensation logic 535 may approximate the transmission bitrate based on other available information. For example, the number of frames transmitted may be multiplied by some factor (e.g. eight plus a target interpacket gap size plus an average or maximum frame size). Or, if the implementing device includes a mechanism for counting the size of each data unit transmitted (e.g. in a port interface controller), a hybrid approach may be used, where that number is added to the number of frames multiplied by some factor to account for preambles and interpacket gaps.

In an embodiment, the rate compensation logic 535 may calculate the number of idle bytes to remove and/or the removal time window based on various metrics related to the operation of the interface and/or network device in which the idle reduction logic 530 is implemented. For example, the rate compensation logic 535 may calculate the number of idle bytes or removal time window size as a function of the transmission utilization level of the interface, or lookup corresponding values in a table that specifies the number of idle bytes and/or removal time window depending on a range in which the transmission utilization level falls under.

In any event, the number of idle bytes left after operation of the idle reduction logic 530 are then inserted into the appropriate point in the data stream 590 (e.g. at the end or beginning of the relevant frame) as interpacket gap 595 by an idle injector 550. Injection may involve simply involve pausing transmission of the stream 590 from the MAC layer in order to transmit the idle bytes, or actually inserting the idle bytes into a data structure used to store the stream 590 while the stream 590 is awaiting transmission, depending on the embodiment.

FIG. 5 is merely an example of idle insertion and idle reduction logic. Other implementations may include fewer and/or additional components in varying arrangements, and the distribution of work between components may likewise vary. For example, in an embodiment, idle reduction logic 530 need not be a separate component that reduces a number of idle bytes selected by amount determination logic 520, but may rather be integrated into the amount determination logic 520 so that the considerations of the idle reduction logic 530 are taken into consideration up front when determining the number if idle bytes to insert. As another example, rate compensation logic 535 may be optional, or integrated directly into the idle reduction logic 530.

In yet another embodiment, the idle reduction logic 530 may be implemented outside of the idle insertion logic 500, at a point after the interpacket gap 595 has already been inserted into the data stream 590. The idle reduction logic 500 may parse the data stream 590 separately and remove idle bytes from interpacket gaps 595 as needed.

2.6. Miscellaneous

Specific systems and techniques are described above and elsewhere herein for reducing the number of idle bytes transmitted in the MAC layer in order to increase transmission rate. However, in other embodiments, the same effect may be achieved through any system and/or technique that reduces the effective interpacket gap size over time relative to a default or target interpacket gap size.

In an embodiment, idle reduction logic is only enabled and activated for an interface if its associated clock rate is behind that of interfaces at other devices whose traffic the interface may be tasked with retransmitting. For instance, it may not be desirable to enable idle reduction logic at an interface whose clock rate is consistently faster than those of interfaces at other devices, since the other devices may not be able to keep up with the increase. Hence, in an embodiment, a first interface at a first device may include idle reduction logic that has been enabled and activated, while a second interface at a second device connected to the first device may disable and/or deactivate such idle reduction logic, either at the command of an administrator who observes or suspects that the first interface has a slower clock rate than the second interface, or of a monitoring component configured to detect such a mismatch automatically.

On the other hand, although idle reduction logic may be implemented and/or activated to compensate for clock rate variance mismatches in some embodiments, in other embodiments, idle reduction logic may be implemented and/or activated to increase the transmission rate for any other suitable purpose.

In yet other embodiments, the idle reduction logic is more generally replaced with idle adjustment logic, which may be configured to add or remove idle bytes, depending on the context. For instance, if an interface has a clock rate consistently above that of other devices, it may be desirable to use the idle adjustment logic to lower the transmission rate of that interface by some ppm by inserting additional idle bytes, rather than reduce idle bytes at the other interfaces. This may further allow for compatibility with devices that may lack idle reduction logic.

Certain embodiments described above assume that idle reduction logic is implemented in the MAC layer of an interface. In yet other embodiments, such idle reduction logic may instead be implemented in the PCS layer or elsewhere in the Physical layer, which may be configured to monitor for and remove idle bytes from the data stream it receives from the MAC layer in similar manner to the techniques described above with respect to the MAC layer. The removal of idle bytes for clock rate variance mismatch and other rate compensation purposes would be in addition to any idle byte removal techniques that the PCS layer may already implement for alignment marker insertion or other purposes.

3.0. Functional Overview

This section describes example process flows for increasing transmission bandwidth within a network interface by reducing the size of an interpacket gap, such as described with respect to FIGS. 2-5 above. The flows may be performed within the switches and network devices described in other sections and/or in other computing devices. In an embodiment, each flow may be performed by a MAC layer 330 or 430 within interface 258 of device 250 using idle insertion logic 500, though the flows may similarly be performed in other network interfaces in other network devices, and idle insertion logic 500 need not be limited specifically to performance of the example flows described below.

In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. General Rate Compensation Flow

Figure 6:
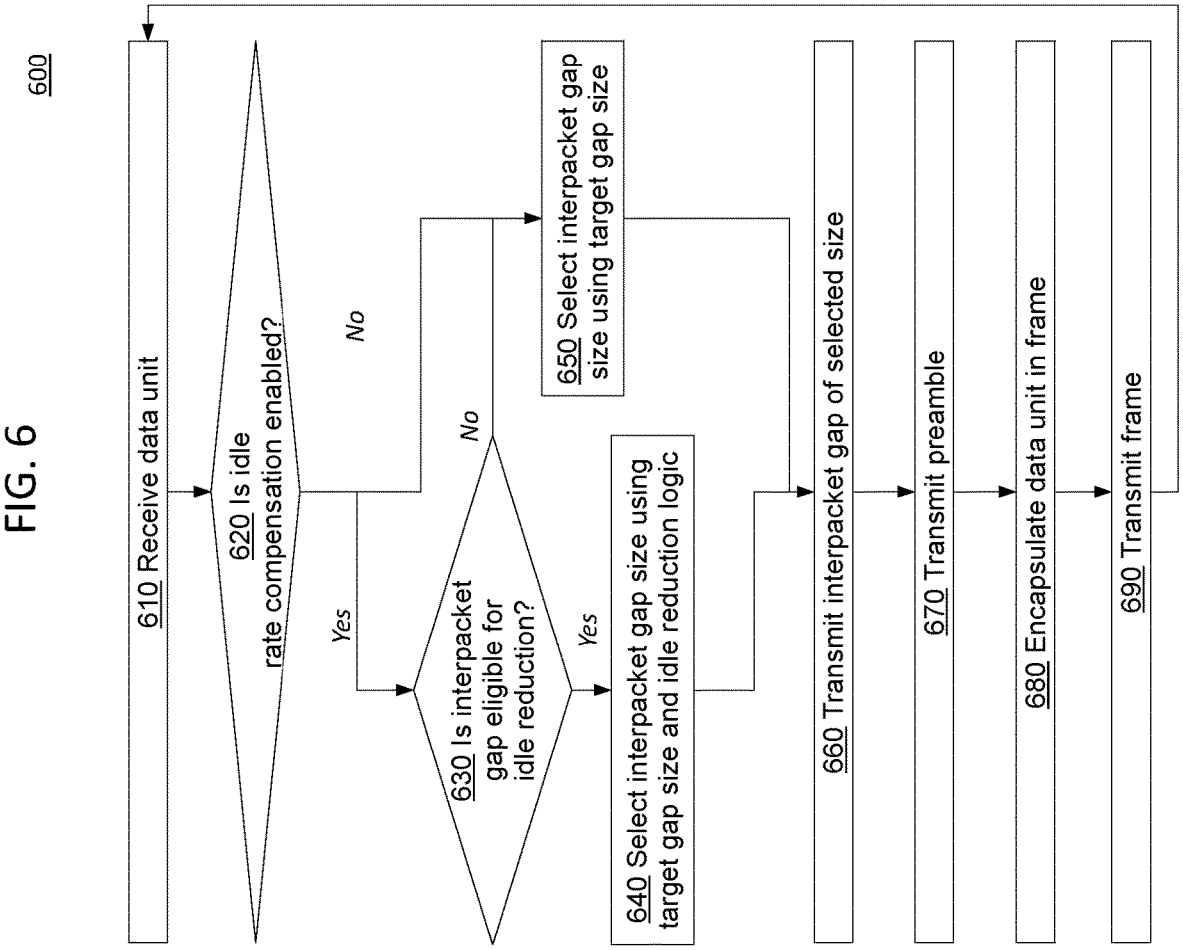
FIG. 6 illustrates a flow for handling a data unit at a MAC layer with idle reduction logic.

FIG. 6 illustrates a flow 600 for handling a data unit at a MAC layer with idle reduction logic, according to an embodiment. Block 610 comprises receiving a data unit at the MAC layer. For example, an outbound receiver in the MAC layer may receive the data unit from packet-handling logic, such as packet-handling logic 256, either directly or via one or more intermediate layers. The data unit may be, for instance, an IP packet that is being forwarded out the network interface to which the MAC layer belongs. In an embodiment, the data unit may have first been received via a different interface coupled to the packet-handing logic 256, which then forwarded the data unit to a port associated with the implementing MAC layer in accordance with forwarding instructions in a forwarding table.

Block 620 comprises determining whether idle rate compensation is enabled. Whether or not idle rate compensation is enabled may be indicated by, for instance, a user-programmable bit or other configuration data. Additionally, or alternatively, there may be a programmable signal that indicates whether idle rate compensation is currently active. The signal may be generated by various logic within the interface or device, based on various state information of the device or interface. For instance, the logic may signal that idle rate compensation is active in response to a high transmission utilization level at the interface, a high buffer fill level within the packet-handling logic, or other related metrics.

If rate compensation is enabled, flow 600 proceeds to block 630, which comprises determining whether the next interpacket gap is eligible for idle reduction. There may be a number of factors to consider when making this determination. For instance, in an embodiment, there may be constraints on how many idle bytes can be removed, or how many interpacket gaps can be reduced in size, over a certain time window. Or, there may be a limit on the number of interpacket gaps that can be reduced in a row. In an embodiment, the expected size of the next interpacket gap may be a consideration. If, for instance, the next interpacket gap is expected to be smaller than a certain threshold, the interpacket gap may be determined to be ineligible for reduction in size. In an embodiment, such a determination may be made by quickly comparing a deficit idle count to a threshold, in which case the interpacket gap would be eligible for reduction size only if greater than the threshold.

If the interpacket gap is determined to be ineligible in block 630, and/or if rate compensation is disabled, flow 600 proceeds to block 640, which comprises selecting an interpacket gap size based on a target gap size. The selected gap size may be the target gap size, or the interpacket gap size may be selected in such a manner as to produce an average gap size equal to the target gap size over time. In an embodiment, a deficit idle count is utilized to achieve an average gap size equal to the target gap size, as explained in other sections, though any other suitable mechanism may be utilized instead.

If, on the other hand, rate compensation is enabled and the interpacket gap is eligible, then flow 600 proceeds to block 640, which comprises selecting a size for the interpacket gap based on a target gap size and on idle reduction logic. The selected size may be, for instance, a function of a size that would have been selected in the manner outlined with respect to block 650, minus a certain number of idle bytes. In an embodiment, that certain number of idle bytes is of a fixed block size (e.g. 8 bytes), though other numbers may be selected depending on the embodiment. In an embodiment, the certain number is selected by rate compensation logic configured to compensate for a clock rate mismatch between interfaces.

Note that, if a deficit idle count or other mechanism is used to try to maintain the average interpacket gap size at a target gap size, the logic for tracking the average gap size (e.g. subtracting the selected amount from the deficit idle count) should be based on the number of bytes selected before the number idle bytes is reduced, as opposed to the final size of the interpacket gap. This means that the actual average gap size will, over time, be less than the target gap size.

Regardless of how the interpacket gap size is selected in blocks 640 and 650, block 660 comprises transmitting an interpacket gap of the selected size from the MAC layer to the PCS layer. Transmission of the interpacket gap is followed by transmission of a preamble in block 670. In block 680, the data unit is itself encapsulated in a frame (e.g. an Ethernet frame) with various metadata (e.g. Ethernet addresses, header information, etc.). Finally, in block 690, the frame is transmitted from the MAC layer to the PCS layer.

Flow 600 then returns to block 610, and is repeated for a new data unit. Flow 600 may be performed any number of times, resulting in a stream of data comprising multiple frames separated by interpacket gaps and preambles.

Flow 600 illustrates but one example method flow for handling a data unit in a MAC layer with idle reduction logic. Other flows may include fewer, additional, and/or different steps in varying arrangements. For instance, in an embodiment, blocks 620-660 may be performed after block 680 and/or 690, such that an interpacket gap is transmitted after the frame instead of before the frame. In an embodiment, a data stream comprising the interpacket gap, preamble, and frame may be assembled prior to transmission, and blocks 660, 670, and 690 may simply comprise transmitting portions of that data stream. In yet another embodiment, the interpacket gap is generated up front from the target gap size, and then reduced in size using idle reduction logic if the determinations of blocks 620 and 630 are both positive.

In another embodiment, flow 600 is performed at least partially in a PCS layer, or at yet other layers of a network interface.

3.2. Window-Based Idle Reduction

Figure 7:
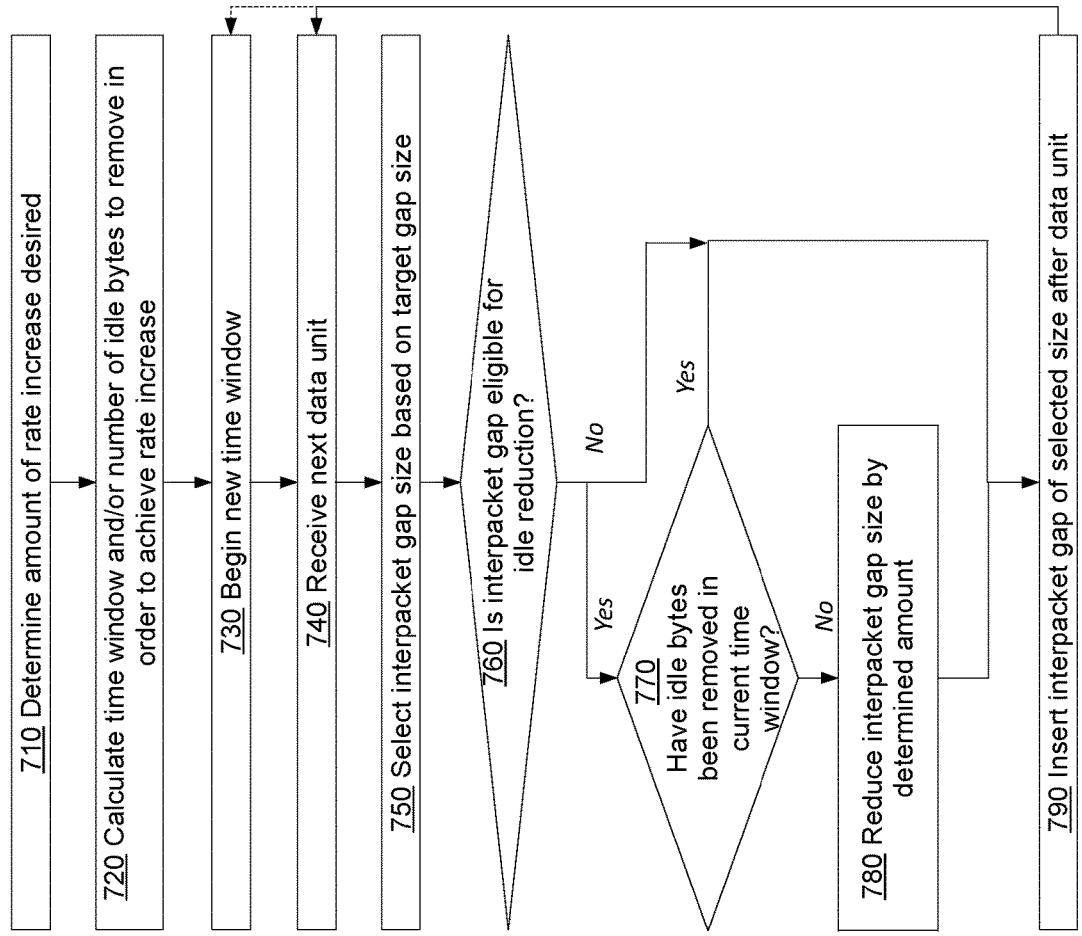
FIG. 7 illustrates a flow for window-based idle reduction in a network interface of a network device.

FIG. 7 illustrates a flow 700 for window-based idle reduction in a network interface of a network device, according to an embodiment. Flow 700 may be performed at a MAC layer or other layer of the network interface. In some embodiments, flow 600 and flow 700 are two views of a same process flow, while in other embodiments flow 700 may be performed as an alternative to flow 600.

Block 710 comprises determining an amount of rate increase desired. In some embodiments, block 710 (and consequently block 720) is a trivial step, since the amount may be fixed at twice the maximum expected clock rate variance of the interface (e.g. 200 ppm). In other embodiments, the amount may be specified by user-programmable configuration data or determined based on monitoring the interface. In the latter case, for example, the amount may be the average or peak difference between clock rate at the interface and some other clocking mechanism within or known to the device. In an embodiment, for instance, this other clocking mechanism may be the clock rate of signals received at one or more other interfaces of the device (e.g. an interface that is port-mapped to the implementing interface, a fastest clock rate received at any of the device's interfaces, etc.).

Block 720 comprises calculating a time window and/or an allotted number of bytes to remove in each time window in order to achieve the desired rate increase. For instance, if the desired rate increase is 1000 bytes per second, the calculation of block 720 might be 100 bytes to remove in a 0.1 second time window, 1 byte to remove in a millisecond time window, or any other suitable combination. Note that, if the rate increase amount determined in block 710 is in terms of ppm, this calculation may entail converting the ppm amount to bits or bytes per second based on the speed of the interface.

In an embodiment, the allotted number of bytes that can be removed is fixed based on constraints of downstream logic (e.g. a PCS block size) or other considerations. Hence, block 720 simply comprises calculating the time window in which that number of bytes should be removed to achieve the desired rate increase. In another embodiment, the time window may be fixed at some specific interval, in which case only the number of bytes to remove during that window is calculated.

Block 730 comprises beginning a new time window. For example, in an embodiment, time window monitoring logic within or coupled to idle reduction logic may signal to the idle reduction logic whenever a new time window begins, so that the idle reduction logic knows to search for an eligible interpacket gap to remove idle bytes from.

Block 740 comprises receiving the next data unit in a stream of data units that is to be transmitted out of the interface. The data unit may be an outbound data unit received in the manner described in block 610 of FIG. 6, or the data unit may be received in any other suitable context. The data unit may or may not be encapsulated in a frame, depending on the implementation.

Block 750 comprises selecting an interpacket gap size for an interpacket gap to be inserted after the data unit. The gap size may be selected in any suitable manner, including without limitation as described in block 640 of FIG. 6.

Block 760 comprises determining whether the interpacket gap is eligible for idle reduction. For example, an interpacket gap may be ineligible because it is too small or fails to meet other criteria, such as described in block 630 of FIG. 6. In some embodiments, all interpacket gaps are eligible, and hence block 760 is a trivial step.

If the interpacket gap is eligible for reduction, then in block 770 it is determined whether the allotted number of ide bytes have already been removed in the current time window.

If so, or if it was determined that the interpacket gap is ineligible for idle reduction in block 760, then flow 700 skips to block 790. Otherwise, flow 700 proceeds to block 780, which comprises reducing the interpacket gap size by the allotted number of idle bytes (or, in some embodiments, by any number of bytes up to the number of bytes remaining to be removed in the current time window).

Block 790 then comprises inserting an interpacket gap of the selected size (either the originally selected size, or the reduced size, depending on which branch of flow 700 was taken) after the data unit in the stream. The interpacket gap may be inserted directly after the data unit, or at the end of a frame in which the data unit has been encapsulated, depending on the embodiment. The stream, including the data unit, interpacket gap, and potentially other inserted data (e.g. preamble, frame delimiter, etc.) may be sent to and further processed by other components, if necessary, and eventually transmitted out of the device in a signal-based representation.

From block 790, flow 700 may return to block 740 for further processing of the stream, or to block 730 when it is time to begin a new time window.

Flow 700 illustrates but one example time-window-based flow for idle reduction. Other flows may include fewer, additional, and/or different steps in varying arrangements. For instance, blocks 760 and 770 may be performed in a different order. As another example, in an embodiment, the interpacket gap is inserted before the data unit (and any preamble other inserted data) rather than after.

Moreover, blocks 710-720 may be repeated periodically, so that the amount, time window, and/or number of bytes adjusts to changes in the device state. In yet other embodiments, the window size and/or number of bytes may be selected based on device metrics. For example, the time window may be a function of an interface transmission utilization level, buffer fill level, and/or other metrics. Similarly, the time window may be located in a lookup table using such metrics.

In an embodiment, blocks 760-780 are performed after block 790, at potentially a different layer of the interface. Rather than reducing the number of idle bytes that will be inserted into the stream, the allotted number of idle bytes are removed from the interpacket gap already in the stream.

3.3. Metric-Based Triggering of Idle Byte Removal

Figure 8:
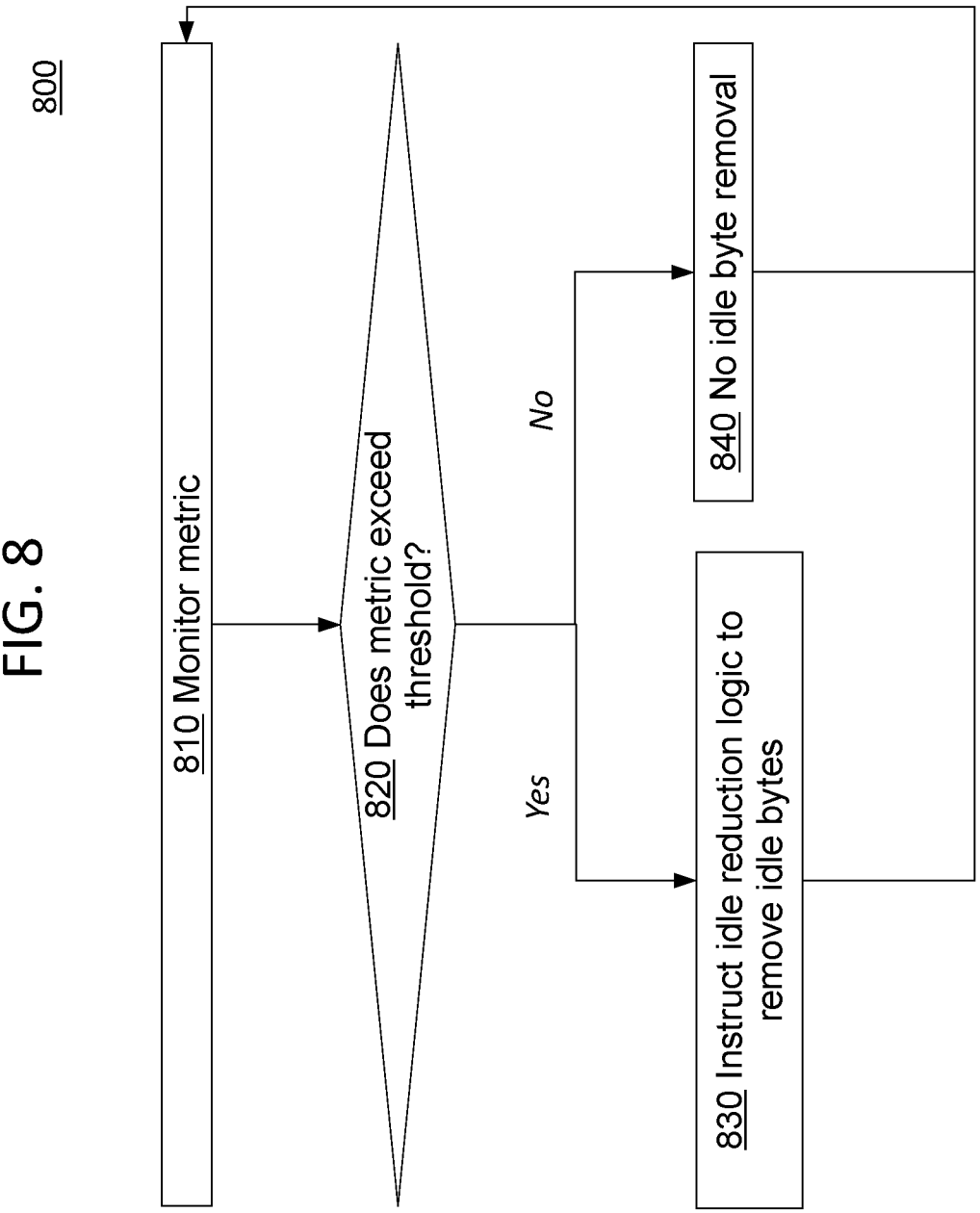
FIG. 8 illustrates a flow for triggering idle byte removal in a network interface of a network device based on one or more metrics associated with the state of the network device.

FIG. 8 illustrates a flow 800 for triggering idle byte removal in a network interface of a network device based on one or more metrics associated with the state of the network device, according to an embodiment. In some embodiments, block 800 may be utilized to enable or activate idle reduction logic programmatically for the purposes of flow 600 or flow 700, though flow 800 may also be utilized by itself for triggering idle byte removal.

Block 810 comprises monitoring a metric associated with the state of the network device. The metric may be monitored at the interface level, such as a transmission rate, a transmission utilization level, a number of data units delivered to the interface over a period of time, a number of bytes in those data units, and so forth. The metric may instead be monitored at the packet-handling level, such as utilization levels of one or more traffic manager buffers assigned to a port associated with the interface, queue sizes of one or more queues associated with those ports, queue delays associated with those queues, and so forth. The metric may also be a function based on one or more of the foregoing.

Block 820 comprises determining whether the metric has surpassed a certain threshold. The threshold may be fixed, or user-programmable.

If the threshold is exceeded, flow 800 proceeds to block 830. Block 830 comprises signaling or otherwise instructing idle reduction logic within the interface to remove a certain number of idle bytes. The idle reduction logic may be deployed in the MAC layer, PCS layer, or at any other point where idle bytes are or have already been inserted into data stream that the interface is to transmit. The idle reduction logic is configured either to adjust the number of idle bytes in an interpacket gap prior to insertion of the interpacket gap in the data stream, or to monitor the data stream for interpacket gaps and remove idle bytes from those gaps. The idle reduction logic may immediately remove the next idle bytes it observes, or the idle reduction logic may wait for an eligible interpacket gap as described in other sections.

The number of idle bytes to remove may be fixed, a function of the metric, or located in a lookup table based upon the metric. In some embodiments, the instruction of block 830 results in the idle reduction logic continuing to remove the same number of idle bytes at intervals (e.g. time windows). The time window may likewise be fixed, a function of the metric, or located in a lookup table based upon the metric.

If the threshold is not exceeded, flow 800 proceeds to block 840, which comprises not reducing the number of idle bytes. In embodiments where the idle reduction logic continues to remove idle bytes at intervals in response to block 830, block 840 may involve signaling or otherwise instructing the idle reduction logic to deactivate and thus stop removing idle bytes.

From 830 and 840, flow 800 returns to block 810, for continued monitoring of the metric. In some embodiments, flow 800 is repeated at a frequency chosen to ensure that a specified amount of bandwidth can be freed up for the interface if warranted by the monitored metric, with each iteration of flow 800 corresponding to, in essence, a time window as described in other sections. In other embodiments, flow 800 may be repeated less frequently. In an embodiment, the frequency with which flow 800 is repeated is itself a function of the metric, or one or more other metrics.

Flow 800 illustrates but one example flow for triggering byte removal. Other flows may include fewer, additional, and/or different steps in varying arrangements.

4.0. Example Idle Byte Removal Scenarios

According to an embodiment, a 100 Gb/s Ethernet interface transmits a series of frames in which each frame has a frame size of 9500B, a PCS block size of 8 bytes, and a target interpacket gap size of 12 bytes. The series may be a series of frames having a fixed frame size, or simply a large number of frames of size 9500B in succession. Transmission of a frame would normally involve transmitting a 8 byte preamble, followed by the 9500 byte frame, followed by four idle bytes to align the frame with the at the 8 byte block boundary (thus having a total of 1188 blocks), and finally followed by 8 additional idle bytes, to produce a 12 byte interpacket gap.

One manner in which idle byte reduction may operate in such a scenario is as follows. With the PCS block size of 8 bytes, any reduction of idle bytes must remove 8 bytes in order to remain compatible with the downstream PCS logic. As explained previously, a 200 ppm clock rate mismatch in a 100 Gb/s interface would result in a need for an additional 8 bytes of bandwidth every 3.2 microseconds, meaning the idle reduction time window would be 3.2 microseconds. Hence, the interpacket gap following the first frame transmitted each 3.2 microseconds would be reduced to 4 bytes instead of 12 bytes.

Note that approximately 4.2 frames can be transmitted in that 3.2 microsecond window. This means that, assuming the idle reduction logic remains active, approximately every fourth interpacket gap would be reduced in size, though after some windows it would be the fifth gap that is reduced instead. Moreover, the approximate average interpacket gap size in a 3.2 microsecond time window would be 10 bytes instead of the target of 12 bytes.

According to another embodiment, a 100 Gb/s Ethernet interface transmits a series of frames in which each frame has a frame size of 64 bytes, with all other operating parameters the same as above. Transmission of a frame would normally involve transmitting an 8 byte preamble, followed by a 64 byte frame, followed by an interpacket gap. The size of each interpacket gap would alternate between 8 bytes and 16 bytes so as to achieve the target average interpacket gaps size of 12 bytes.

In a 3.2 microsecond time window, approximately 476 frames would be transmitted. Normally, 238 of these frames would be followed by 8 byte interpacket gaps, and the other 238 of these frames would be followed by 16 byte interpacket gaps. The idle reduction logic would reduce the first one of these 16 byte interpacket gaps to 8 bytes, meaning that there would be 239 interpacket gaps of 8 bytes and 237 interpacket gaps of 16 bytes. The approximate average interpacket gap size in the 3.2 time window would thus be 11.98 bytes instead of the target of 12 bytes.

5.0. Example Embodiments

Examples of some embodiments are represented, without limitation, as follows:

According to an embodiment, a network apparatus comprising: a media access control ("MAC") layer configured to receive data units, encapsulate the data units in frames, and transmit the frames with at least interpacket gaps inserted therebetween, the media access control layer comprising: idle insertion logic configured to select sizes for the interpacket gaps based upon a target gap size; idle reduction logic configured to reduce the sizes of particular interpacket gaps of the interpacket gaps, thereby increasing a transmission bandwidth for the data units.

In an embodiment, a number of idle bytes by which the idle reduction logic reduces the sizes of the particular interpacket gaps in a period of time corresponds substantially to twice a maximum expected clock rate variance of a clocking mechanism in that period of time, the clocking mechanism associated with a physical interface coupled to the MAC layer.

In an embodiment, the network apparatus further comprises rate compensation logic configured to signal to the idle reduction logic that the idle reduction logic should reduce an interpacket gap by a certain number of idle bytes in a next time window.

In an embodiment, the rate compensation logic is configured to monitor one or more metrics associated with one or more states of the network apparatus and, when the one or more metrics exceed a threshold, send the signal to the idle reduction logic.

In an embodiment, the rate compensation logic is configured to monitor a MAC transmission utilization level and, when the MAC transmission utilization level exceeds a threshold, send the signal to the idle reduction logic.

In an embodiment, the threshold is substantially equal to 99.9%, 99.99%, 99.999%, or 99.9998%, depending on the embodiment.

In an embodiment, the threshold is substantially equal to 100% minus twice a maximum expected clock rate variance of a clocking mechanism associated with a physical interface coupled to the MAC layer.

In an embodiment, the idle reduction logic is configured to select only one interpacket gap to reduce in size in a given time window.

In an embodiment, the idle reduction logic is configured to only remove a fixed number of idle bytes from each of the particular interpacket gaps, and to calculate the time window based on determining how frequently the fixed number of idle bytes must be removed from the interpacket gaps in order to increase the transmission bandwidth by a specified amount.

In an embodiment, the fixed number of idle bytes is a Physical Coding Sublayer ("PCS") block size.

In an embodiment, the idle insertion logic is configured to select the sizes for the interpacket gaps based upon a target gap size by using a deficit idle count; wherein, for each interpacket gap, the idle insertion logic is configured to: increment the deficit idle count by the target gap size; select a gap size for the interpacket gap that is the highest multiple of a fixed block size but still lower than the deficit idle count; and subtract the selected gap size from the deficit idle count; wherein the idle reduction logic is configured to only reduce the sizes of interpacket gaps that are greater than a certain size.

In an embodiment, the MAC layer is configured to receive the data units from packet-switching logic coupled directly or indirectly to the MAC layer, and to transmit the frames with interpacket gaps inserted therebetween to a PCS layer.

In an embodiment, the MAC layer belongs to a first network interface, wherein the apparatus comprises the first interface and a second interface, wherein the second interface is port-mapped to the first interface.

In an embodiment, the idle reduction logic reduces the sizes of the particular interpacket gaps by removing idle bytes from the interpacket gaps.

In an embodiment, the idle reduction logic reduces the sizes of the particular interpacket gaps by reducing the number of idle bytes that are generated for the particular interpacket gaps.

In an embodiment, the data units are IP packets and the frames are Ethernet frames, the MAC layer further including preamble insertion logic configured to insert a preamble before each of the frames.

According to an embodiment, a network apparatus comprises: a network interface configured to receive data units and transmit the data units with at least interpacket gaps inserted therebetween, the network interface including: idle insertion logic configured to insert the interpacket gaps before or after the data units; idle reduction logic configured to reduce sizes of particular interpacket gaps of the interpacket gaps; metric monitoring logic configured to monitor one or more metrics associated with a state of the network apparatus; rate compensation logic configured to instruct the idle reduction logic to reduce a size of one of the particular interpacket gaps responsive to the one or more metrics meeting a certain threshold.

In an embodiment, the network interface is further configured to encapsulate the data units in frames, the interpacket gaps inserted before or after the frames.

In an embodiment, the one or more metrics is a transmission utilization level of the network interface.

In an embodiment, the threshold is substantially within 0.1% of a maximum utilization level.

In an embodiment, the network apparatus further comprises: a plurality of network interfaces, including the network interface; packet switching logic configured to switch data units between the network interfaces; a buffer associated with the packet-switching logic; wherein the one or more metrics is an amount of buffer space in the buffer that is currently occupied by data units being forwarded to the network interface.

In an embodiment, the rate compensation logic is configured to instruct the idle reduction logic to reduce a size of one of the particular interpacket gaps at a frequency selected based on the one or more metrics.

In an embodiment, the idle insertion logic is in a MAC layer of the network interface, wherein the idle reduction logic is in a PCS layer of the network interface.

According to an embodiment, a method comprises: for each data unit of a plurality of data units: receiving the data unit at a MAC layer of a network interface; encapsulating the data unit in a frame; transmitting the frame to a PCS layer; selecting a size for an interpacket gap to follow the frame based upon a target gap size; transmitting the interpacket gap to the PCS layer; for a particular interpacket gap following a particular frame encapsulating a particular data unit of the data units, reducing a number of idle bytes in the particular interpacket gap prior to generating the interpacket gap and/or transmitting the interpacket gap to the PCS layer, thereby increasing a transmission bandwidth for the data units.

In an embodiment, the particular interpacket gap is reduced in size after the size of the particular interpacket gap is already selected based upon the target gap size.

In an embodiment, the method further comprises monitoring one or more metrics associated with one or more states of the network apparatus and, when the one or more metrics exceed a threshold, performing said reducing the number of idle bytes in the particular interpacket gap, the particular interpacket gap being a next eligible interpacket gap to be transmitted to the PCS layer.

In an embodiment, the method is repeated for each of a plurality of time windows, wherein each of the time windows is of a period of time calculated based on determining how frequently interpacket gaps must be reduced by a fixed number of idle bytes in order to increase the transmission bandwidth by a specified amount.

In an embodiment, the method further comprises removing idle bytes from interpacket gaps between the data units at a rate that corresponds substantially to twice a maximum expected clock rate variance of a clocking mechanism associated with a physical interface coupled to the PCS layer.

In an embodiment, selecting the size of the interpacket gap comprises: incrementing a deficit idle count by the target gap size; selecting, as the size of the interpacket gap, a highest multiple of a fixed block size that is still lower than the deficit idle count; and subtracting the selected gap size from the deficit idle count.

Yet other example embodiments are described in other sections herein.

6.0. Example Network Device

Figure 9:
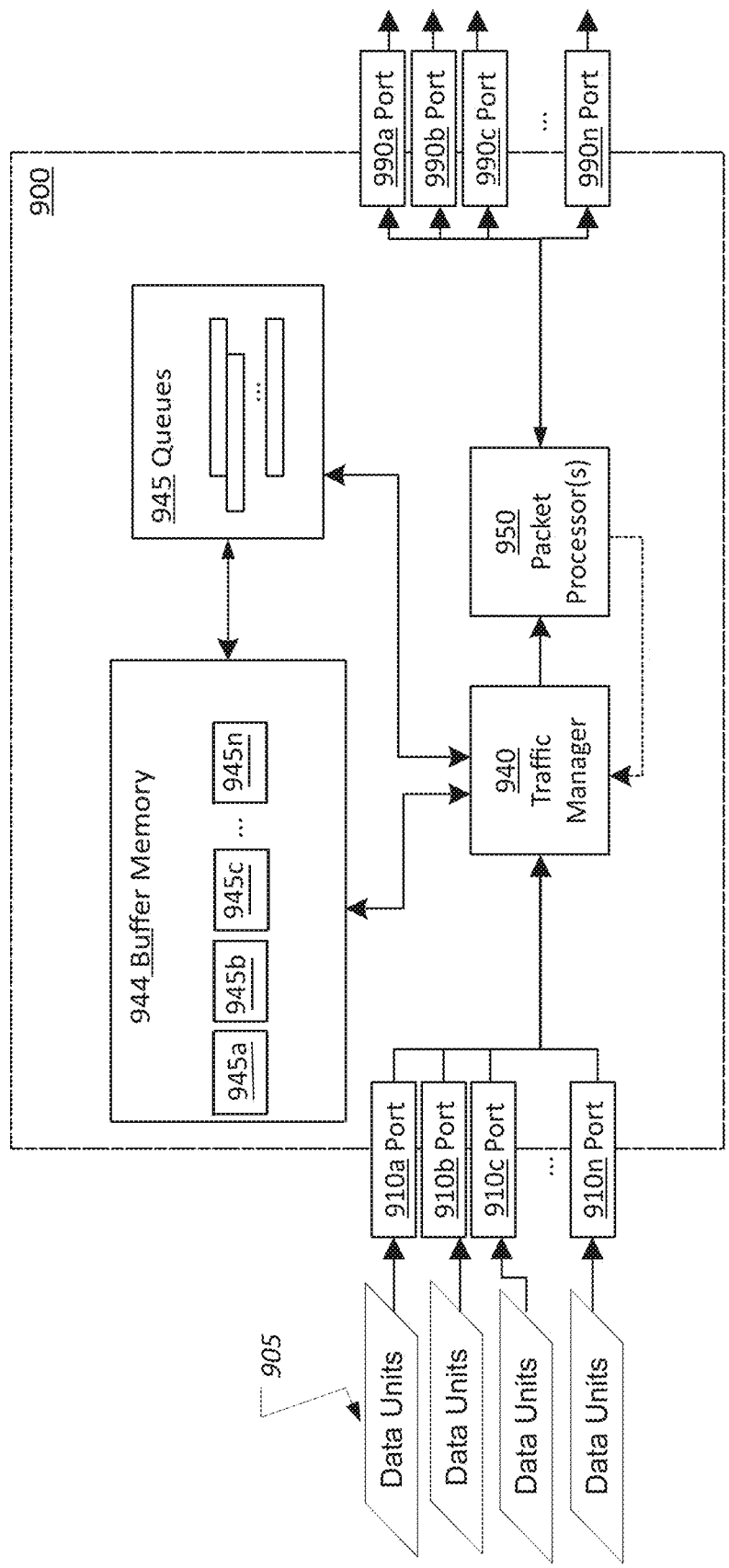
FIG. 9 is an illustrative view of various aspects of an example network device in which techniques described herein may be practiced.

FIG. 9 is an illustrative view of various aspects of packet-switching logic within an example network device 900 in which techniques described herein may be practiced, according to an embodiment. Network device 900 is a computing device comprising any combination of hardware and software configured to implement the various logical components described herein, including components 910-990. For example, the apparatus may be a single networking computing device, such as a router or switch, in which some or all of the components 910-990 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 910-990.

Device 900 is generally configured to receive and forward data units 905 to other devices in a network, such as network 100, by means of a series of operations performed at various components within the device 900. Note that certain nodes 110 in a system such as network 100 may each be or include a separate network device 900. In an embodiment, a node 110 may include more than one device 900. In an embodiment, device 900 may itself be one of a number of components within a node 110. For instance, network device 900 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 905 through various subcomponents of the packet-switching logic of device 900 is as follows. After being received via a port 910, a data unit 905 may be buffered by an arbiter (not depicted) until the data unit 905 can be processed by an ingress packet processor 950, and then delivered to an interconnect (not depicted). From the interconnect, the data unit 905 may be forwarded to a traffic manager 940. The traffic manager 940 may store the data unit 905 in a buffer 944 and assign the data unit 905 to a queue 945. The traffic manager 940 manages the flow of the data unit 905 through the queue 945 until the data unit 905 is released to an egress packet processor 950. Depending on the processing, the traffic manager 940 may then assign the data unit 905 to another queue so that it may be processed by yet another egress processor 950, or the egress packet processor 950 may send the data unit 905 to an egress arbiter (not depicted) from which the data unit 905 is finally forwarded out another port 990. Of course, depending on the embodiment, the switching logic may omit some of these subcomponents and/or include other subcomponents in varying arrangements.

Example components of a device 900 are now described in further detail.

6.1. Ports

Network device 900 includes ports 910/990. Ports 910/990 are connected to network interfaces, such as interfaces 212, 252, 258, or 300. Ports 910, including ports 910*a-n*, are inbound ("ingress") ports by which data units 905 are received from other devices in a network via the network interfaces. Ports 990, including ports 990*a-n*, are outbound ("egress") ports by which at least some of the data units 905 are sent out the network interfaces to other destinations within the network, after having been processed by the packet-switching logic of network device 900.

Ports 910/990 are depicted as separate ports for illustrative purposes, but may actually correspond to the same physical network interfaces on the network device 910. That is, a network device 900 may both receive data units 905 and send data units 905 over a single physical port, and the single physical port may thus function as both an ingress port 910 and egress port 990. Nonetheless, for various functional purposes, certain logic of the network device 900 may view a single physical port as a separate ingress port 910 and egress port 990. Moreover, for various functional purposes, certain logic of the network device 900 may subdivide a single physical ingress port or egress port into multiple ingress ports 910 or egress ports 990, or aggregate multiple physical ingress ports or egress ports into a single ingress port 910 or egress port 990. Hence, in various embodiments, ports 910 and 990 should be understood as distinct logical constructs that are mapped to physical interfaces rather than simply as distinct physical constructs.

6.2. Packet Processors

A device 900 comprises one or more packet processing components 950, or "packet processors." Different packet processors 950 may be configured to perform different packet processing tasks. These tasks may include, for example, identifying paths along which to forward data units 905, forwarding data units 905 to egress ports 990, implementing flow control and/or other policies, manipulating packets, performing statistical or debugging operations, and so forth. A device 900 may comprise any number of packet processors 950 configured to perform any number of processing tasks.

In an embodiment, the packet processors 950 within a device 900 may be arranged such that the output of one packet processor 950 may, eventually, be inputted into another packet processor 950, in such a manner as to pass data units 905 from certain packet processor(s) 950 to other packet processor(s) 950 in a sequence of stages, until finally disposing of the data units 905 (e.g. by sending the data units 905 out an egress port 990, "dropping" the data units 905, etc.). The exact set and/or sequence of packet processors 950 that process a given data unit 905 may vary, in some embodiments, depending on attributes of the data unit 905 and/or the state of the device 900. Any number of packet processors 950 may be chained together in this manner.

Based on decisions made while processing a data unit 905, a packet processor 950 may, in some embodiments, and/or for certain processing tasks, manipulate a data unit 905 directly. For instance, the packet processor 950 may add, delete, or modify information in a data unit header or payload. In other embodiments, and/or for other processing tasks, a packet processor 950 may generate control information that accompanies the data unit 905, or is merged with the data unit 905, as the data unit 905 continues through the device 900. This control information may then be utilized by other components of the device 900 to implement decisions made by the packet processor 950.

In an embodiment, a packet processor 950 need not necessarily process an entire data unit 905, but may rather only receive and process a subunit of a data unit 905, such as a cell comprising header information for the data unit. For instance, if the data unit 905 is a packet comprising multiple cells, the first cell, or a first subset of cells, might be forwarded to a packet processor 950, while the remaining cells of the packet (and potentially the first cell(s) as well) are forwarded in parallel to a merger component where they await results of the processing.

In an embodiment, a packet processor may be generally classified as an ingress packet processor 950 or an egress packet processor 950. Generally, an ingress processor 950 resolves destinations for a traffic manager 940 to determine which ports 990 and/or queues 945 a data unit 905 should depart from. There may be any number of ingress processors 950, including just a single ingress processor 950.

In an embodiment, an ingress processor 950 performs certain intake tasks on data units 905 as they arrive. These intake tasks may include, for instance, and without limitation, parsing data units 905, performing routing related lookup operations, categorically blocking data units 905 with certain attributes and/or when the device 900 is in a certain state, duplicating certain types of data units 905, making initial categorizations of data units 905, and so forth. Once the appropriate intake task(s) have been performed, the data units 905 are forwarded to an appropriate traffic manager 940, to which the ingress processor 950 may be coupled directly or via various other components, such as an interconnect component.

The egress packet processor(s) 950 of a device 900, by contrast, may be configured to perform non-intake tasks necessary to implement the switching logic of the device 900. These tasks may include, for example, tasks such as identifying paths along which to forward the data units 905, implementing flow control and/or other policies, manipulating data units, performing statistical or debugging operations, and so forth. In an embodiment, there may be different egress packet processors(s) 950 assigned to different flows or other categories of traffic, such that not all data units 905 will be processed by the same egress packet processor 950.

In an embodiment, each egress processor 950 is coupled to a different group of egress ports 990 to which they may send data units 905 processed by the egress processor 950. In an embodiment, access to a group of ports 990 may be regulated via an egress arbiter coupled to the egress packet processor 950. In some embodiments, an egress processor 950 may also or instead be coupled to other potential destinations, such as an internal central processing unit, a storage subsystem, or a traffic manager 940.

6.3. Buffers

Since not all data units 905 received by the device 900 can be processed by the packet processor(s) 950 at the same time, various components of device 900 may temporarily store data units 905 in one or more buffers 944 while the data units 905 are waiting to be processed. For example, a certain packet processor 950 may only be capable of processing a certain number of data units 905, or portions of data units 905, in a given clock cycle, meaning that other data units 905, or portions of data units 905, destined for the packet processor 950 must either be ignored (e.g., dropped) or stored. At any given time, a large number of data units 905 may be stored in the buffers 944 of the device 900, depending on network traffic conditions.

A device 900 may include a variety of buffers 944, each utilized for varying purposes and/or components. A buffer 944 may be implemented using a single physical memory unit (e.g. SRAM, DRAM, etc.), a designated portion of a memory unit, or a collection of memory units, depending on an embodiment.

Generally, a data unit 905 awaiting processing by a component is held in a buffer 944 associated with that component until the data unit 905 is "released" to the component for processing. For example, a traffic manager 940 will typically have a relatively large buffer 944, referred to as an egress buffer, in which it buffers data units 905 prior to releasing those data units 950 to an egress packet processor 950.

Various metrics related to the buffers 944 may be tracked, such as the number of buffer entries utilized, percentage of buffer space utilized, and so forth. These metrics may be global, or specific to a context. For instance, the amount of buffered data assigned to a specific queue or port may be tracked. Utilization metrics for these contexts may be calculated as percentages of amounts of buffer space allocated to these contexts.

6.4. Queues

In an embodiment, to manage the order in which data units 905 are processed from buffers 944, various components of a device 900 may implement queueing logic. For example, the flow of data units 905 through the egress buffers 944 of traffic manager 940 may be managed using egress queues while the flow of data units 905 through the buffers of an ingress arbiter might be managed using ingress queues.

A queue 945 is a set of data nodes arranged in some order by metadata describing the queue 945. The queue 945 includes a head node, or head, which is typically the next node to be processed, and a tail node, or tail, which is typically the node most recently added to the queue. A node will typically progress from the tail to the head over time as other nodes are processed and removed from the queue.

In the case of queue 945, the nodes are data unit 905, or the buffer locations(s) at which the data unit 905 begins. A data unit 905 that has been added to a queue 945 is said to be "linked" to that queue 945. A data unit 905 may belong to one or more queues 945.

In many embodiments, the sequence in which the queue 945 arranges its constituent data units 905 generally corresponds to the order in which the data units 905 or data unit portions in the queue 945 will be released and processed. In some embodiments, the number of data units 905 or data unit portions assigned to a given queue 945 at a given time may be limited, either globally or on a per-queue basis, and this limit may change over time.

In an embodiment, queues 945 are implemented using a linking memory referred to an "inter-packet" link memory, which is separate from the associated buffer memory 944. Each entry in the link memory is said to be a node in the queue. Each link entry points comprises a data pointer, which, when the link entry is occupied, points to a memory location in the buffer memory 944 at which a corresponding data unit (or at least the start of the data unit) is found (e.g. a buffer entry, a first entry for the data unit in an intra-packet link memory, etc.). Each entry in the link memory further may further comprises a link pointer to another link entry, which corresponds to the next node in the queue. Of course, in other embodiments, other types of linking memories and/or other structures may instead be utilized instead to represent the queue.

6.5. Traffic Management

According to an embodiment, a device 900 further includes one or more traffic managers 940 configured to control the flow of data units 905 to one or more packet processor(s) 950. A traffic manager 940 may receive data units 905 directly from a port 910, from an ingress processor 950, and/or other suitable components of device 900. In an embodiment, the traffic manager 940 is configured to receive up to one cell from each possible source (e.g. each port 910) each clock cycle of the traffic manager 940.

Traffic manager 940 may include or be coupled to buffers 944 for buffering data units 905 prior to sending those data units 905 to their respective processor(s) 950. A buffer manager within the traffic manager 940 may temporarily store data units 905 in buffers 944 as they await processing by processor(s) 950. A data unit 905 or data unit portion in a buffer 944 may eventually be "released" to one or more processor(s) 950 for processing, by reading the data unit 905 from the buffer 944 and sending the data unit 905 to the processor(s) 950. In an embodiment, traffic manager 940 may release up to a certain number of data units 905 from buffers 944 to processors 950 each clock cycle.

Beyond managing the use of buffers 944 to store data units 905 (or copies thereof), a traffic manager 940 may include queue management logic configured to assign data units 905 to queues 945 and manage the flow of data units 905 through queues 945. The traffic manager 940 may, for instance, "enqueue" a data unit 905 that has been fully buffered by identifying a specific queue 945 to assign the data unit 905 to, and then linking a data unit identifier or other metadata to the assigned queue. The traffic manager 940 may further determine when to release—also referred to as dequeuing—data units 905 from queues 945 by sending instructions to the buffer manager 944 to read/release the data units 905 and then providing the data read from the buffer 944 to specific packet processor(s) 950.

Though only one packet processor 950 and traffic manager 940 are depicted, a device 900 may comprise any number of packet processors 950 and traffic managers 940. For instance, different sets of ports 910 and/or ports 990 may have their own traffic manager 940 and packet processors 950. As another example, in an embodiment, the traffic manager 940 may be duplicated for some or all of the stages of processing a data unit. For example, system 900 may include a traffic manager 940 and egress packet processor 950 for an egress stage performed upon the data unit 905 exiting the system 900, and/or a traffic manager 940 and packet processor 950 for any number of intermediate stages. The data unit 905 may thus pass through any number of traffic managers 940 and/or packet processors 950 prior to exiting the system 900. In other embodiments, only a single traffic manager 940 is needed. If intermediate processing is needed, flow of a data unit 905 may loop back to the traffic manager 940 for buffering and/or queuing after each stage of intermediate processing.

In an embodiment, a traffic manager 940 is coupled to the output of an ingress packet processor(s) 950, such that data units 905 (or portions thereof) are assigned to buffers 944 only upon being initially processed by an ingress packet processor 950. Once in an egress buffer 944, a data unit 905 (or portion thereof) may be "released" to one or more egress packet processor(s) 950 for processing.

In the course of processing a data unit 905, a device 900 may replicate a data unit 905 one or more times for purposes such as, without limitation, multicasting, mirroring, debugging, and so forth. For example, a single data unit 905 may be replicated to multiple egress queues 945. For instance, a data unit 905 may be linked to separate queues 945 for each of ports 1, 3, and 9. As another example, a data unit 905 may be replicated a number of times after it reaches the head of a queue 945 (e.g. for different egress processors 950). Hence, though certain techniques described herein may refer to the original data unit 905 that was received by the device 900, it will be understood that those techniques will equally apply to copies of the data unit 905 that have been generated for various purposes.

6.6. Forwarding Logic

The logic by which a device 900 determines how to handle a data unit 905—such as where and whether to send a data unit 905, whether to perform additional processing on a data unit 905, etc.—is referred to as the forwarding logic of the device 900. This forwarding logic is collectively implemented by a variety of the components of the device 900, such as described above. For example, an ingress packet processor 950 may be responsible for resolving the destination of a data unit 905 and determining the set of actions/edits to perform on the data unit 905, and an egress packet processor 950 may perform the edits. Or, the egress packet processor 950 may also determine actions and resolve a destination in some cases. Also, there may be embodiments where the ingress packet processor 950 performs edits as well.

In an embodiment, a device 900 will typically store in its memories one or more forwarding tables (or equivalent structures) that map certain data unit attributes or characteristics to actions to be taken with respect to data units 905 having those attributes or characteristics, such as sending a data unit 905 to a selected path, or processing the data unit 905 using a specified internal component. For instance, such attributes or characteristics may include a Quality-of-Service level specified by the data unit 905 or associated with another characteristic of the data unit 905, a flow control group, an ingress port 910 through which the data unit 905 was received, a tag or label in a packet's header, a source address, a destination address, a packet type, or any other suitable distinguishing property. A device 900 may, for example, implement logic that reads such a table, determines one or more ports 990 to send a data unit 905 to based on the table, and sends the data unit 905 to an egress processor 950 that is coupled to the one or more ports 990.

According to an embodiment, the forwarding tables describe groups of one or more addresses, such as subnets of IPV4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

As data units 905 are routed through different nodes in a network, the nodes may, on occasion, discard, fail to send, or fail to receive certain data units 905, thus resulting in the data units 905 failing to reach their intended destination. The act of discarding of a data unit 905, or failing to deliver a data unit 905, is typically referred to as "dropping" the data unit. Instances of dropping a data unit 905, referred to herein as "drops" or "packet loss," may occur for a variety of reasons, such as resource limitations, errors, or deliberate policies. Different components of a device 900 may make the decision to drop a data unit 905 for various reasons. For instance, a traffic manager 940 may determine to drop a data unit 905 because, among other reasons, buffers 944 are overutilized, a queue 945 is over a certain size, a port 990 (or its associated interface) is too busy, and/or a data unit 905 has a certain characteristic.

6.7. Miscellaneous

Device 900 illustrates only several of many possible arrangements of components in a network device configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 100.

For simplification, the traffic managers, packet processors, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

It will be appreciated that the actual physical representation of a data unit may change as a result of the processes described herein. For instance, a data unit may be converted from a physical representation at a particular location in one memory to a signal-based representation, and back to a physical representation at a different location in a potentially different memory, as it is moved from one component to another within a network device or even between network devices. Such movement may technically involve deleting, converting, and/or copying some or all of the data unit any number of times. For simplification, however, the data unit is logically said to remain the same data unit as it moves through the device, even if the physical representation of the data unit changes. Similarly, the contents and/or structure of a data unit may change as it is processed, such as by adding or deleting header information, adjusting cell boundaries, or even modifying payload data. A modified data unit is nonetheless still said to be the same data unit, even after altering its contents and/or structure.

7.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 10:
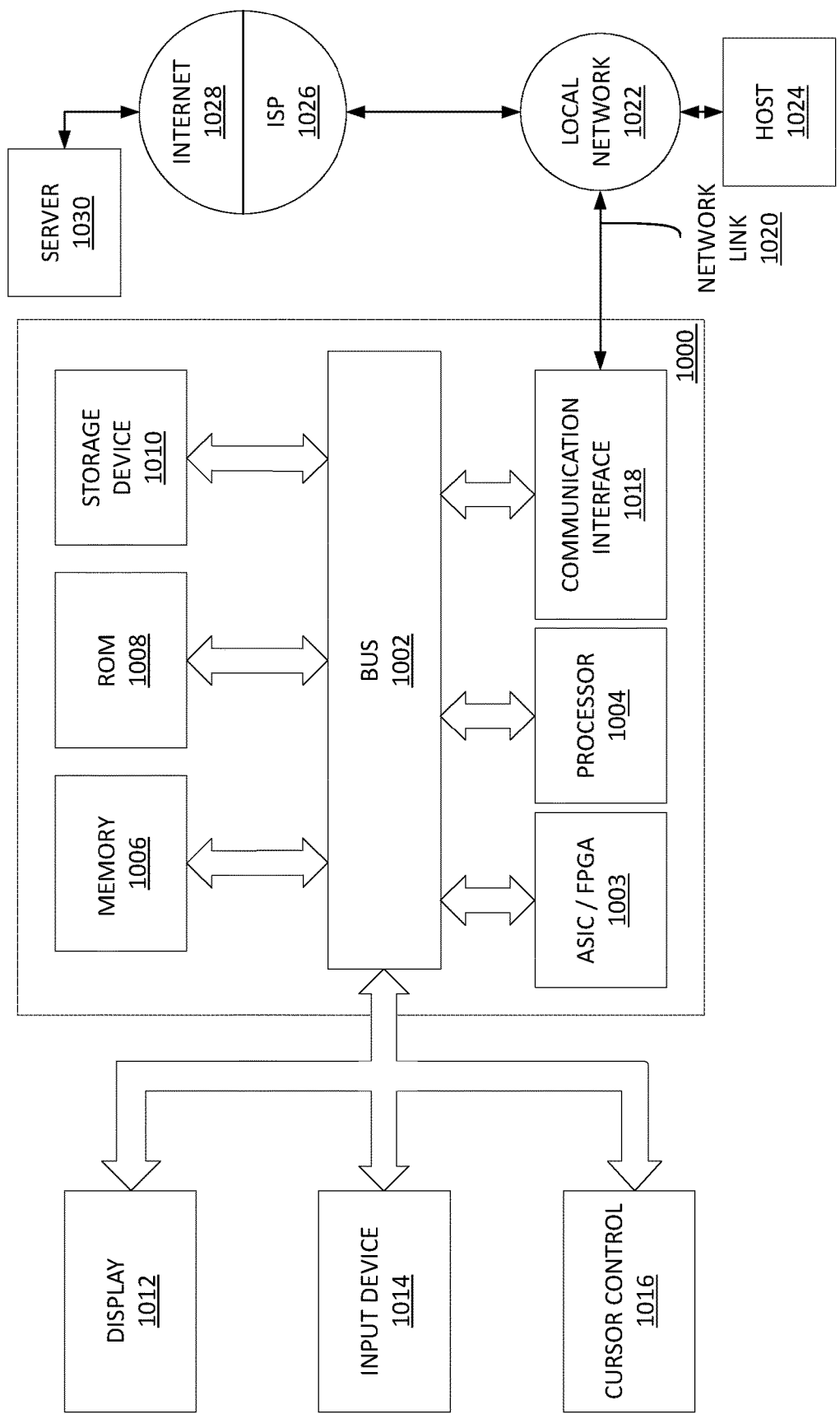
FIG. 10 is a block diagram that illustrates an example computer system that may be utilized in implementing the above-described techniques.

FIG. 10 is a block diagram that illustrates an example computer system 1000 that may be utilized in implementing the above-described techniques, according to an embodiment. Computer system 1000 may be, for example, a desktop computing device, laptop computing device, tablet, smartphone, server appliance, computing mainframe, multimedia device, handheld device, networking apparatus, or any other suitable device. In an embodiment, FIG. 10 constitutes a different view of the devices and systems described in previous sections.

Computer system 1000 may include one or more ASICs, FPGAs, or other specialized circuitry 1003 for implementing program logic as described herein. For example, circuitry 1003 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1000 may include one or more hardware processors 1004 configured to execute software-based instructions. Computer system 1000 may also include one or more busses 1002 or other communication mechanism for communicating information. Busses 1002 may include various internal and/or external components, including, without limitation, internal processor or memory busses, a Serial ATA bus, a PCI Express bus, a Universal Serial Bus, a HyperTransport bus, an InfiniBand bus, and/or any other suitable wired or wireless communication channel.

Computer system 1000 also includes one or more memories 1006, such as a RAM, hardware registers, or other dynamic or volatile storage device for storing data units to be processed by the one or more ASICs, FPGAs, or other specialized circuitry 1003. Memory 1006 may also or instead be used for storing information and instructions to be executed by processor 1004. Memory 1006 may be directly connected or embedded within circuitry 1003 or a processor 1004. Or, memory 1006 may be coupled to and accessed via bus 1002. Memory 1006 also may be used for storing temporary variables, data units describing rules or policies, or other intermediate information during execution of program logic or instructions.

Computer system 1000 further includes one or more read only memories (ROM) 1008 or other static storage devices coupled to bus 1002 for storing static information and instructions for processor 1004. One or more storage devices 1010, such as a solid-state drive (SSD), magnetic disk, optical disk, or other suitable non-volatile storage device, may optionally be provided and coupled to bus 1002 for storing information and instructions.

A computer system 1000 may also include, in an embodiment, one or more communication interfaces 1018 coupled to bus 1002. A communication interface 1018 provides a data communication coupling, typically two-way, to a network link 1020 that is connected to a local network 1022. For example, a communication interface 1018 may be an integrated services digital network (ISDN) card, cable modem, satellite modem, or a modem to provide a data communication connection to a corresponding type of telephone line. As another example, the one or more communication interfaces 1018 may include a local area network (LAN) card to provide a data communication connection to a compatible LAN. As yet another example, the one or more communication interfaces 1018 may include a wireless network interface controller, such as an 1002.11-based controller, Bluetooth controller, Long Term Evolution (LTE) modem, and/or other types of wireless interfaces. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by a Service Provider 1026. Service Provider 1026, which may for example be an Internet Service Provider (ISP), in turn provides data communication services through a wide area network, such as the world-wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

In an embodiment, computer system 1000 may send and receive data units through the network(s), network link 1020, and communication interface 1018. In some embodiments, this data may be data units that the computer system 1000 has been asked to process and, if necessary, redirect to other computer systems via a suitable network link 1020. In other embodiments, this data may be instructions for implementing various processes related to the described techniques. For instance, in the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. As another example, information received via a network link 1020 may be interpreted and/or processed by a software component of the computer system 1000, such as a web browser, application, or server, which in turn issues instructions based thereon to a processor 1004, possibly via an operating system and/or other intermediate layers of software components.

Computer system 1000 may optionally be coupled via bus 1002 to one or more displays 1012 for presenting information to a computer user. For instance, computer system 1000 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1012 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1012.

One or more input devices 1014 are optionally coupled to bus 1002 for communicating information and command selections to processor 1004. One example of an input device 1014 is a keyboard, including alphanumeric and other keys. Another type of user input device 1014 is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. Yet other examples of suitable input devices 1014 include a touch-screen panel affixed to a display 1012, cameras, microphones, accelerometers, motion detectors, and/or other sensors. In an embodiment, a network-based input device 1014 may be utilized. In such an embodiment, user input and/or other information or commands may be relayed via routers and/or switches on a Local Area Network (LAN) or other suitable shared network, or via a peer-to-peer network, from the input device 1014 to a network link 1020 on the computer system 1000.

As discussed, computer system 1000 may implement techniques described herein using customized hard-wired logic, one or more ASICs or FPGAs 1003, firmware and/or program logic, which in combination with the computer system causes or programs computer system 1000 to be a special-purpose machine. According to one embodiment, however, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media may also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 1000 may receive the data on the network and demodulate the signal to decode the transmitted instructions. Appropriate circuitry may then place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

8.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network apparatus comprising:
a media access control (MAC) processing layer configured to receive data units, encapsulate the data units in frames, and transmit the frames with at least interpacket gaps inserted therebetween to a physical coding sublayer (PCS) layer, the MAC processing layer comprising:
an idle inserter configured to insert interpacket gaps between frames within time windows, the interpacket gaps within a time window meet an average target interpacket gap size;
an idle reducer configured to:
determine that a frame is within a particular time window; and
based on the determination that the frame is within the particular time window, calculate a number of idle bytes to be removed from an interpacket gap for the frame based on an average number of idle bytes removed from previous interpacket gaps within the particular time window, the removed idle bytes increase MAC processing layer transmission rate.

2. The network apparatus of claim 1, wherein the number of idle bytes to be removed is fixed.

3. The network apparatus of claim 1, wherein the number of idle bytes to be removed is bounded by a minimum number.

4. The network apparatus of claim 1, wherein the time window is selected to achieve the increase in the transmission rate by a configurable amount.

5. The network apparatus of claim 1, wherein the idle reducer is limited to a configurable number of times that idle bytes are removed from one or more interpacket gaps in a time window.

6. The network apparatus of claim 1, further comprising a rate compensator configured to signal to the idle reducer that the idle reducer is to remove a certain number of idle bytes from one or more interpacket gaps in a next time window.

7. The network apparatus of claim 1, further comprising a rate compensator configured to monitor one or more metrics associated with one or more states of the network apparatus and, when the one or more metrics exceed a threshold, signal to the idle reducer that the idle reducer is to remove a certain number of idle bytes from one or more interpacket gaps in a next time window.

8. The network apparatus of claim 1, further comprising a rate compensator configured to monitor a MAC transmission utilization level and, when the MAC transmission utilization level exceeds a threshold, signal to the idle reducer that the idle reducer is to remove a certain number of idle bytes from an interpacket gap in a next time window.

9. The network apparatus of claim 1, wherein the MAC processing layer is further configured to receive the data units from a packet switcher coupled directly or indirectly to the MAC processing layer.

10. The network apparatus of claim 1, wherein the MAC processing layer belongs to a first network interface, wherein the network apparatus comprises the first network interface and a second network interface, wherein the second network interface is port-mapped to the first network interface.

11. A method comprising:
receiving a plurality of data units at a media access control (MAC) layer of a network interface;
encapsulating the plurality of data units in a plurality of frames;
inserting interpacket gaps between frames within time windows, the interpacket gaps within a time window meet an average target interpacket gap size;
determining that a frame is within a particular time window;
based on the determination that the frame is within the particular time window, calculating a number of idle bytes to be removed from an interpacket gap for the frame based on an average number of idle bytes removed from previous interpacket gaps within the particular time window, the removed idle bytes increase MAC processing layer transmission rate;
removing the calculated number of idle bytes from the interpacket gap;

transmitting the interpacket gap and the frame to a physical coding sublayer (PCS) layer.

12. The method of claim 11, wherein the number of idle bytes to be removed is fixed.

13. The method of claim 11, wherein the number of idle bytes to be removed is bounded by a minimum number.

14. The method of claim 11, wherein the time window is selected to achieve the increase in the transmission rate by a configurable amount.

15. The method of claim 11, wherein the calculating a number of idle bytes to be removed is limited to a configurable number of times that idle bytes are removed from one or more interpacket gaps in a time window.

16. The method of claim 11, wherein the calculating a number of idle bytes to be removed is instructed by a rate compensator to remove a certain number of idle bytes from one or more interpacket gaps in a next time window.

17. The method of claim 11, further comprising monitoring one or more metrics associated with one or more states of the network interface and, when the one or more metrics exceed a threshold, the calculating a number of idle bytes to be removed removes a certain number of idle bytes from one or more interpacket gaps in a next time window.

18. The method of claim 11, further comprising monitoring a MAC transmission utilization level and, when the MAC transmission utilization level exceeds a threshold, the calculating a number of idle bytes to be removed removes a certain number of idle bytes from one or more interpacket gaps in a next time window.

19. One or more non-transitory computer-readable storage media, storing one or more sequences of instructions, which when executed by one or more processors cause performance of:
receiving a plurality of data units at a media access control (MAC) layer of a network interface;
encapsulating the plurality of data units in a plurality of frames;
inserting interpacket gaps between frames within time windows, the interpacket gaps within a time window meet an average target interpacket gap size;
determining that a frame is within a particular time window;
based on the determination that the frame is within the particular time window, calculating a number of idle bytes to be removed from an interpacket gap for the frame based on an average number of idle bytes removed from previous interpacket gaps within the particular time window, the removed idle bytes increase MAC processing layer transmission rate;
removing the calculated number of idle bytes from the interpacket gap;
transmitting the interpacket gap and the frame to a physical coding sublayer (PCS) layer.

20. The one or more non-transitory computer-readable storage media of claim 19, wherein the time window is selected to achieve the increase in the transmission rate by a configurable amount.

\* \* \* \* \*